United States Patent
Lin et al.

(10) Patent No.: US 11,402,278 B2
(45) Date of Patent: Aug. 2, 2022

(54) LOW-TEMPERATURE DRY BLOCK TEMPERATURE CALIBRATOR

(71) Applicant: BEIJING CONST INSTRUMENTS TECHNOLOGY INC., Beijing (CN)

(72) Inventors: Jianjun Lin, Beijing (CN); Xuecan Li, Beijing (CN); Chengjiang Wu, Beijing (CN)

(73) Assignee: BEIJING CONST INSTRUMENTS TECHNOLOGY INC., Beijing (CN)

( * ) Notice: Subject to any disclaimer, the term of this patent is extended or adjusted under 35 U.S.C. 154(b) by 154 days.

(21) Appl. No.: 16/961,134

(22) PCT Filed: Jan. 7, 2019

(86) PCT No.: PCT/CN2019/070621
§ 371 (c)(1),
(2) Date: Jul. 9, 2020

(87) PCT Pub. No.: WO2019/137330
PCT Pub. Date: Jul. 18, 2019

(65) Prior Publication Data
US 2020/0400512 A1   Dec. 24, 2020

(30) Foreign Application Priority Data

Jan. 9, 2018  (CN) .......................... 201810018472.8
Jan. 9, 2018  (CN) .......................... 201810019030.5
(Continued)

(51) Int. Cl.
*G01K 15/00*  (2006.01)
*G01K 7/02*  (2021.01)

(52) U.S. Cl.
CPC ............. *G01K 15/005* (2013.01); *G01K 7/02* (2013.01); *G01K 15/002* (2013.01)

(58) Field of Classification Search
CPC ............................... G01K 15/005; G01K 7/02
(Continued)

(56) References Cited

U.S. PATENT DOCUMENTS

2007/0289314 A1    12/2007  Liebmann et al.
2007/0291814 A1*   12/2007  Hirst .................... G01K 15/005
                                                                        374/1
(Continued)

FOREIGN PATENT DOCUMENTS

CN         101639390 A      2/2010
CN         204188309 U      3/2015
(Continued)

OTHER PUBLICATIONS

Mar. 27, 2019 Search Report issued in International Patent Application No. PCT/CN2019/070621.
(Continued)

*Primary Examiner* — Mirellys Jagan
(74) *Attorney, Agent, or Firm* — Oliff PLC

(57) ABSTRACT

A low-temperature dry body temperature calibrator used for temperature calibration of an element, and including a furnace body, a control panel assembly and a housing of modular design, the furnace body and control panel are assembled in the housing, the top surface of the housing has a plurality of heat dissipation holes, the top of the control panel assembly is spaced apart from the top surface of the housing, a flow guiding fan is at the top of the control panel assembly, and a flow guiding plate inclined to the heat dissipation holes on the top surface of the housing is above the flow guiding fan. The furnace body has a compact structure, and the radiators have a light weight and a high heat dissipation efficiency, improving the operation stability and temperature measurement accuracy of the furnace body,
(Continued)

and the furnace body is suitable for temperature measurement of low-temperature elements.

20 Claims, 12 Drawing Sheets

(30) Foreign Application Priority Data

| Jan. 9, 2018 | (CN) | 201810019111.5 |
|---|---|---|
| Jan. 9, 2018 | (CN) | 201810019770.9 |
| Jan. 9, 2018 | (CN) | 201820031567.9 |
| Jan. 9, 2018 | (CN) | 201820031598.4 |
| Jan. 9, 2018 | (CN) | 201820032013.0 |
| Jan. 9, 2018 | (CN) | 201820032475.2 |
| Jan. 9, 2018 | (CN) | 201820033217.6 |

(58) Field of Classification Search
USPC .......................................... 374/1, 141, 208
See application file for complete search history.

(56) References Cited

U.S. PATENT DOCUMENTS

| 2007/0291815 | A1* | 12/2007 | Walker | G01K 15/005 |
| | | | | 374/1 |
| 2009/0064603 | A1* | 3/2009 | James | G01K 15/00 |
| | | | | 52/169.5 |
| 2009/0121033 | A1* | 5/2009 | Sjogren | G01K 15/005 |
| | | | | 237/2 A |
| 2013/0148687 | A1 | 6/2013 | Sjogren et al. | |
| 2019/0383674 | A1* | 12/2019 | Rehm-Gumbel | H05K 7/20 |
| 2020/0370971 | A1* | 11/2020 | Lin | F27D 21/0014 |
| 2020/0400512 | A1* | 12/2020 | Lin | G01K 7/02 |
| 2021/0063253 | A1* | 3/2021 | Gao | G01K 15/002 |
| 2021/0123820 | A1* | 4/2021 | Maunumäki | G01K 15/005 |

FOREIGN PATENT DOCUMENTS

| CN | 105651421 A | 6/2016 |
| CN | 106686942 A | 5/2017 |
| CN | 207675334 U | 7/2018 |
| CN | 207866392 U | 9/2018 |
| EP | 0 686 835 A1 | 12/1995 |

OTHER PUBLICATIONS

Jul. 14, 2020 International Preliminary Report on Patentability issued in International Patent Application No. PCT/CN2019/070621.

Sep. 6, 2021 Partial Supplementary Search Report issued in European Patent Application No. 19738064.5.

Jan. 3, 2022 European Search Report issued in European Application 19738064.5.

* cited by examiner

LOW-TEMPERATURE DRY BLOCK TEMPERATURE CALIBRATOR

TECHNICAL FIELD

The present disclosure belongs to the technical field of temperature instrumentation calibration, and particularly relates to a low-temperature dry block temperature calibrator.

BACKGROUND ART

Presently, dry block temperature calibrators, especially portable dry block temperature calibrators, are widely applied in industrial sites, measurement locations and laboratories in all walks of life and have broad market prospects.

In a low-temperature dry block temperature calibrator, the temperature condition near the furnace body is relatively harsh for some other components and elements during use. Therefore, it is necessary to isolate the surrounding environment from other parts. In addition, the furnace body as a core component often has to be commissioned and maintained separately during production and use. In existing products, the furnace body is often locked together with other parts. Consequently, the entire machine has to be disassembled once any problem occurs, greatly increasing maintenance cost.

SUMMARY OF THE INVENTION

The present disclosure provides a modularly assembled low-temperature dry block temperature calibrator.

The low-temperature dry block temperature calibrator in the present disclosure is implemented with the following technical scheme:

A low-temperature dry block temperature calibrator, used for temperature calibration of a temperature element under test, comprising:

a furnace body (1) provided with a furnace opening into which a temperature element under test is inserted, and the bottom of the furnace body (1) is fixed on a base (5);

a control board assembly (2) whose bottom is fixed on the base (5);

wherein the base (5) and an upper housing (6) enclose the furnace body (1) and the control board assembly (2), a through-hole (63) is formed on the upper housing (6) at a position corresponding to the furnace opening of the furnace body (1), and a plurality of heat dissipation holes (62) are formed on the top surface of the upper housing (6).

The low-temperature dry block temperature calibrator further comprises a system board assembly (3) electrically connected with the control board assembly (2) and assembled on the front side of the upper housing (6).

In the low-temperature dry block temperature calibrator, there is a spacing between the top of the control board assembly (2) and the upper housing (6), a flow guide fan (26) is provided at the top of the control board assembly (2), and a flow guide plate (25) configured to guide the flow to the heat dissipation holes (62) is provided above the flow guide fan (26).

In the low-temperature dry block temperature calibrator, the control board assembly (2) comprises:

a control board bracket (21) having a structure of U-shaped slot;

a switching power supply (22) disposed and fixed in the U-shaped slot of the control board bracket (21);

a control board (24) fixed at an opening of the U-shaped slot of the control board bracket (21);

wherein a heat dissipation block (23) is mounted on one side of the lower part of the control board (24), and the side of the control board (24) on which the heat dissipation block (23) is mounted faces the switching power supply (22); the flow guide fan (26) is mounted at the top of the switching power supply (22).

In the low-temperature dry block temperature calibrator, the system board assembly (3) comprises a touch screen panel (35), a touch screen foam (34), a touch LCD (33), a touch LCD bracket (32) and a system board (31), which are sequentially arranged from front to back, wherein the touch screen panel (35) is in a cover shape, and a cover surface of the touch screen panel (35) is arranged with an assembly area that matches the touch LCD (33) in shape and size; one or more connection ports (36) are provided on a side of the system board (31), a plurality of interface holes (37) are provided on a side of the touch screen panel (35), and the connection ports (36) are mounted in correspondence with the interface holes (37); the touch screen foam (34), the touch LCD (33), the touch LCD bracket (32) and the system board (31) are sequentially stacked and assembled into a cover body of the touch screen panel (35) as a whole.

The low-temperature dry block temperature calibrator further comprises a measurement board assembly (4), which is assembled on a side surface of the upper housing (6) and electrically connected with the control board assembly (2).

In the low-temperature dry block temperature calibrator, the measurement board assembly (4) comprises a front panel (41) and a measurement board (42), the measurement board (42) is provided with a plurality of test connection terminals, jacks are respectively provided on the front panel (41) at a position in correspondence with the test connection terminals of the measurement board (42), and the front panel (41) and the measurement board (42) are stacked and fixed on the periphery in a way that the jacks are aligned to the test connection terminals.

In the low-temperature dry block temperature calibrator, the measurement board (42) is provided with a TC socket element (43), which has a thermocouple cold-end temperature compensation structure and is fixed on the measurement board (42), and two sockets (041) provided at the front end of the TC socket element (43) correspond to the jacks arranged on the front panel (41) and are used for plugging a thermocouple from outside.

In the low-temperature dry block temperature calibrator, the upper housing (6) is engaged to the periphery of the base (5), and the bottom surface and side surfaces of the base (5) are provided with a plurality of ventilation slots (51) respectively.

In the low-temperature dry block temperature calibrator, the upper housing (6) is made of a plastic material.

In the low-temperature dry block temperature calibrator, the furnace body (1) comprises:

a furnace core (11) comprising a foam thermal insulation body (11-2), a thermostatic block (11-3) arranged inside the foam thermal insulation body (11-2), a soaking block (11-7) mounted in an open slot arranged on the upper part of the thermostatic block (11-3), and radiators mounted on both sides of the foam thermal insulation body (11-2); and a cooling fan (13) disposed below the furnace core (11).

In the low-temperature dry block temperature calibrator, the furnace core (11) further comprises a plurality of refrigerating plates (11-4) mounted in through-slots respectively arranged on two side walls of the foam thermal insulation body (11-2), one side of the refrigerating plates (11-4) is in contact with the thermostatic block (11-3) arranged in the foam thermal insulation body (11-2), and the other side of the refrigerating plates (11-4) is in contact with a hot end of the radiators.

In the low-temperature dry block temperature calibrator, the thermostatic block (11-3) is a square body formed by two opposing recessed arc-shaped surfaces (11-31) and two opposing horizontal side surfaces, the cross-sectional shape of the thermostatic block (11-3) is an hourglass shape that is wider at the two ends and narrower in the middle, and the two horizontal side surfaces of the thermostatic block (11-3) are respectively in contact with the refrigerating plates (11-4).

In the low-temperature dry block temperature calibrator, on the part clamped by the two arc-shaped surfaces (11-31) of the thermostatic block (11-3), the widest parts at both ends are wide portions (11-32), the narrowest part in the middle is a narrow portion (11-33), the width of the wide portions (11-32) is within a range of 30 mm to 80 mm, and the width of the narrow portion (11-33) is within a range of 20 mm to 50 mm.

In the low-temperature dry block temperature calibrator, the furnace core (11) further comprises a sensor group (11-5), which comprises a plurality of sensing elements including a pair of differential thermocouples, a thermal resistance temperature sensor and an over-temperature alarm sensor, wherein the sensing elements are mounted in a plurality of mounting via-holes arranged in the foam thermal insulation body (11-2), and a probe portion of the sensing element is embedded in the thermostatic block (11-3).

In the low-temperature dry block temperature calibrator, the furnace core (11) further comprises an air guide plate (11-6), the bottom of the foam thermal insulation body (11-2) has a V-shaped structure, the cross section of the air guide plate (11-6) has a V-shaped long plate structure, and the air guide plate (11-6) is overlapped with the V-shaped bottom of the foam thermal insulation body (11-2), and the two side edges of the air guide plate (11-6) are respectively fixed to bottom edges of the radiators (11-1) disposed on both sides, at a position near the foam thermal insulation body (11-2).

In the low-temperature dry block temperature calibrator, the furnace body (1) further comprises a furnace body bracket (12), which comprises a coaming (12-1) and two side plates (12-2), the cooling fan (13) is mounted on the bottom of the coaming (12-1), the two side plates (12-2) are respectively mounted on two sides of the coaming (12-1), and the furnace core (11) is mounted in the furnace body bracket (12).

In the low-temperature dry block temperature calibrator, the furnace body (1) further comprises a furnace opening heat-insulating block (14) made of polytetrachloroethylene material and a top decorative plate (11-8) disposed at the top of the furnace opening heat-insulating block (14), the furnace opening heat-insulating block (14) is mounted at the furnace opening at the upper end of the furnace core (11), and the top decorative plate (11-8) is connected to the radiators by screws.

In the low-temperature dry block temperature calibrator, the radiator is a first radiator (11-1), the first radiator (11-1) comprises a set of fins (11-11) formed by a plurality of fins and a soaking plate (11-12) vertically connected with the set of fins (11-11), wherein the fins are sheet-shaped aluminum foils, and the plurality of fins are arranged in parallel with each other and spaced apart from each other; the set of fins (11-11) are connected with the soaking plate (11-12) into a whole by welding, crimping or bonding.

In the low-temperature dry block temperature calibrator, the first radiator (11-1) further comprises a base plate (11-13) fixedly connected to the soaking plate (11-12), the soaking plate (11-12) comprises a flat plate portion (11-121), one side of the flat plate portion (11-121) is tightly attached and fixed to the set of fins (11-11), and the other side of the flat plate portion (11-121) extends outwards and forms a boss portion (11-122), the boss portion (11-122) is provided with a cavity (11-123) therein, the inner surface of the cavity (11-123) has a porous structure, and the cavity (11-123) is filled with a cooling medium; the base plate (11-13) is provided with one or more through-slots (11-131) that match the boss portion (11-122) of the soaking plate (11-12) in shape and size, the boss portion (11-122) of the soaking plate (11-12) is embedded into the through-slot (11-131), and the base plate (11-13) and the soaking plate (11-12) are fixedly connected into a whole.

In the low-temperature dry block temperature calibrator, the radiator is a second radiator (19-1), which comprises a U-shaped thermo-tube (19-12), a heat conducting plate (19-13) and a set of heat dissipation fins (19-11) formed by a plurality of heat dissipation fins, wherein the heat dissipation fins are sheet-shaped aluminum foils, the plurality of heat dissipation fins are arranged in parallel and spaced apart from each other to form the set of heat dissipation fins (19-11), and the set of heat dissipation fins (19-11) are connected with the heat conducting plate (19-13) into a whole by welding, crimping or bonding; the U-shaped thermo-tube comprises a first side arm (19-121) disposed in parallel, a second side arm (19-122) disposed in parallel, and a connecting section (19-123) connecting the first side arm and the second side arm, wherein the first side arm (19-121) is inserted between the set of heat dissipation fins (19-11) and the heat conducting plate (19-13), and the second side arm (19-122) is inserted into the set of heat dissipation fins (19-11).

In the low-temperature dry block temperature calibrator, a cavity is provided in the U-shaped thermo-tube and filled with a cooling medium, and the inner surface of the cavity has a porous structure.

In the low-temperature dry block temperature calibrator, the second radiator (19-1) further comprises a first side plate (19-14) and a second side plate (19-15), which are arranged vertically on the both sides of the heat conducting plate (19-13) respectively to formed into a rectangular slot structure, the heat conducting plate (19-13) is positioned at the bottom of the rectangular slot structure, the set of heat dissipation fins (19-11) are arranged inside the rectangular slot structure, and each heat dissipation fin is parallel to the first side plate (19-14) and the second side plate (19-15) located on both two sides.

In the low-temperature dry block temperature calibrator, the first side plate (19-14) comprises a rectangular fixing plate (19-141) tightly attached to the set of heat dissipation fins (19-11), and the three sides of the fixing plate (19-141) that are not adjacent to the heat conducting plate (19-13) respectively extend outwards vertically to form a folded edge respectively; the second side plate (19-15) and the first side plate (19-14) are identical in structure and are arranged symmetrically on the both sides of the heat conducting plate (19-13); a plurality of second semi-circular concave strips (19-131) arranged on a side of the heat conducting plate (19-13) that is tightly attached to the set of heat dissipation fins (19-11) are correspondingly combined with a plurality of first semi-circular concave strips (19-111) arranged on the set of heat dissipation fins (19-11) and a plurality of second semi-circular openings (19-142) arranged on the fixing plates (19-141) located on both sides so as to form a plurality of first circular holes, and the first side arms (19-121) of the U-shaped thermo-tubes (19-12) are inserted into the corresponding first circular holes; a plurality of circular through-holes (19-143) are distributed with an equal interval on the other side of the fixing plate (19-141) that is away from the heat conducting plate (19-13); a plurality of second circular holes (19-112) are distributed with an equal interval on one side of the set of heat dissipation fins (19-11) which is away from the heat conducting plate (19-13), and the second side arms (19-122) of the U-shaped thermo-tubes (19-12) pass through the circular through-hole (19-143) of the fixing plate (19-141) and are inserted into the second circular holes (19-112) of the set of heat dissipation fins (19-11).

In the low-temperature dry block temperature calibrator, the plurality of U-shaped thermo-tubes (19-12) are grouped into two groups, the first side arms (19-121) of each group of U-shaped thermo-tubes (19-12) are tightly attached together, while the second side arms (19-122) are spaced apart at an equal interval; the corresponding first circular holes are also grouped into two groups and match the first side arms (19-121) of the U-shaped thermo-tubes (19-12) in shape; the second circular holes (19-112) are spaced apart at an equal interval and match the second side arms (19-122) of the U-shaped thermo-tubes (19-12) in shape.

In the low-temperature dry block temperature calibrator, the thermocouple cold-end temperature compensation structure comprises a cold-end temperature sensor (01), second soaking blocks (03) and a cap (04), wherein two second soaking blocks (03) are provided and spaced apart from each other, each second soaking block (03) is connected with an elastic plate (02) thereon, the cold-end temperature sensor (01) is mounted on the upper side of either elastic plate (02), the cold end of the thermocouple (05) is disposed between the elastic plate (02) and the second soaking block (03) and tightly attached to the elastic plate (02) and the second soaking block (03), and the thermal capacity of the second soaking block (03) is much larger than the thermal capacity of the elastic plate (02) and the thermal capacity of the cold-end temperature sensor (01).

In the low-temperature dry block temperature calibrator, the elastic plate (02) is an elastomer with small thermal capacity and good heat conductivity and has an S-shaped structure, the tail end of the elastic plate (02) is fixed to the tail end of the second soaking block (03), the head end of the elastic plate (02) rises up, and the portion close to the head end is freely disposed on the upper surface of the second soaking block (03); heat-conducting adhesive is applied between the two second soaking blocks (03).

In the low-temperature dry block temperature calibrator, the thermocouple cold-end temperature compensation structure further comprises a lead-out wire terminal (06), a lead-out wire of the cold-end temperature sensor (01) is led out from the tail of the cap (04) to the lead-out wire terminal (06), and the lead-out wire terminal (06) is plugged on the measurement board (42); the front end of the cap (04) is provided with two sockets, which correspond to the position between the elastic plate (02) and the second soaking block (03), so that the cold end of the thermocouple (05) is inserted therein.

In the low-temperature dry block temperature calibrator, a plastic sleeve or heat-insulating adhesive is provided at a portion of the cold-end temperature sensor (01) mounted on the elastic plate (02) that the cold-end temperature sensor (01) is not in contact with the elastic plate (02); the cold-end temperature sensor (01) is adhered to the elastic plate (02) by an adhesive, and a protective plate is respectively provided at the both sides of the elastic plate (02) at a position where it is bonded to the cold-end temperature sensor (01).

With the above technical scheme, the present disclosure attains the following technical effects:

The low-temperature dry block temperature calibrator in the present disclosure is in a modular design, and the furnace body, the control board assembly, the system board assembly and the measurement board assembly are assembled independently from each other, which is convenient for assembling and disassembling individual assemblies. As a result, when a single assembly malfunctions, only the malfunctioned assembly has to be disassembled separately, without disassembling the entire machine, thus the maintenance cost can be reduced and the maintenance efficiency can be improved.

(1) The low-temperature dry block temperature calibrator in the present disclosure is in a modular design, and the furnace body and other assemblies and components can be disassembled independently from each other, thus the convenience of production and maintenance is improved effectively and the production and maintenance cost of the product is reduced effectively;

(2) The present disclosure provides two types of radiators. In one type of radiators, a set of fins and a soaking plate whose internal cavity is filled with a cooling medium are arranged vertically and connected into a whole, one side of the soaking plate contacts a heat source, and the soaking plate acts together with the set of fins to dissipate heat, thus the heat dissipation efficiency and heat dissipation effect are improved; in the other type of radiators, U-shaped thermo-tubes are embedded into the interior of a set of heat dissipation fins and a heat conducting plate, thus the space occupation of the radiator is reduced, and the U-shaped thermo-tubes acts together with the set of heat dissipation fins to dissipate heat, thereby the heat dissipation effect is improved.

(2) The dissipation fins of the radiators in the present disclosure are made of sheet-shaped aluminum foils and have small spacing and light weight. Compared with an aluminum extrusion radiator with the same heat dissipation area, the weight of the radiator in the present disclosure is reduced by about 23%-40%.

(3) The cross section of the soaking block in the furnace body in the present disclosure is in an hourglass shape that is wider at the both sides and narrower in the middle. With such a structure, the soaking block has light weight and small thermal capacity, is sensitive to temperature change, and thus is helpful for measurement accuracy of the device under test; besides, since the two opposite sides of the soaking block are wider, the refrigerating plates arranged on the both sides of the soaking block are larger in size, attaining a good heat dissipation effect;

(4) The furnace body in the present disclosure has a reasonable structural layout and a compact structure, and employs a design that two airflow channels are sealed independently from each. Thus, the high-temperature air in the furnace body has no adverse effect on the working environment of other components, and the service life of the electronic components and elements is prolonged; besides, the effect of heat generated by other components on the furnace body is isolated, the working stability of the furnace body and the temperature measurement accuracy are improved. Therefore, the furnace body is applicable to temperature measurement of low-temperature elements under test.

MAIN REFERENCE NUMBERS

Figure 1:
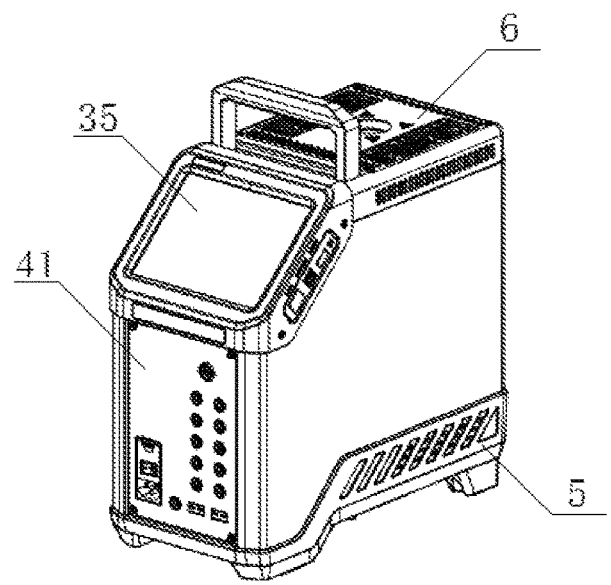
FIG. 1 is a schematic diagram of the overall structure of the low-temperature dry block temperature calibrator according to the present disclosure.

1: furnace body, 11: furnace core, 12: furnace body bracket, 13: cooling fan, 14: furnace opening heat-insulating block;

2: control board assembly, 21: control board bracket, 22: switching power supply, 23: control board radiator, 24: control board, 25: flow guide plate, 26: flow guide fan, 27: power connection terminal;

3: system board assembly, 31: system board, 32: touch LCD bracket, 33: touch LCD, 34: touch screen foam, 35: touch screen panel, 36: connection port, 37: interface hole;

4: measurement board assembly, 41: front panel, 42: measurement board, 43: TC socket element (thermocouple cold-end temperature compensation module);

5: base, 51: ventilation slot;

6: upper housing, 61: shell, 62: heat dissipation hole, 63: through-hole;

7: assembling parts;

01: cold-end temperature sensor, 02: elastic plate, 03: second soaking block, 04: cap, 041: socket; 05: thermocouple, 06: lead-out wire terminal, 07: screw.

EMBODIMENTS

Hereinafter the low-temperature dry block temperature calibrator in the present disclosure will be described in detail with reference to the accompanying drawings and specific embodiments.

The low-temperature dry block temperature calibrator in the present disclosure is in a modular design and can be conveniently disassembled and assembled. In the embodiment shown in FIG. 6, the low-temperature dry block temperature calibrator in the present disclosure comprises a furnace body 1, a control board assembly 2, a system board assembly 3, a measurement board assembly 4, an upper housing 6 and a base 5, wherein the system board assembly 3 is assembled on the front side of the upper housing 6, the furnace body 1 and the control board assembly 2 are respectively fixed on the base (5), and the upper housing 6 and the base 5 are in snap fit to form a housing, the furnace body 1 and the control board assembly 2 are located in the housing, the upper part of the furnace body 1 is provided with a furnace opening, a through-hole 63 is arranged on the upper housing 6 at a position corresponding to the furnace opening of the furnace body 1 for inserting a temperature element under test therein, and the top surface of the upper housing 6 is provided with a plurality of heat dissipation holes 62. In an embodiment, the furnace body 1 is adjacent to and fixed to the control board assembly 2. The measurement board assembly 4 may be fixed to the front side of the control board assembly 2. The system board assembly 3 may be mounted on top of the measurement board assembly 4 and the control board assembly 2. The measurement board assembly 4 is provided with a front panel 41 and the system board assembly 3 is provided with a touch screen panel 35. A enclosed space formed by the front panel 41, the touch screen panel 35 and the housing encapsulates the furnace body 1, the control board assembly 2, the system board assembly 3 and the measurement board assembly 4 to form a whole. Thus, the furnace body 1 and each assembly can be disassembled independently, so as to facilitate maintenance and replacement.

The control board assembly 2 is equivalent to the brain of the low-temperature dry block temperature calibrator. The system board assembly 3, the measurement board assembly 4, and the cooling fan 13, the refrigerating plates 11-4 and the sensor group 11-5 in the furnace body 1 (see the section that describes the furnace body 1) are electrically connected with the control board assembly 2 and perform data interaction with the control board assembly 2. That is, the control board assembly 2 reads the temperature data measured by the sensor group 11-5, the electrical signals measured by the measurement board assembly 4 and various parameters set by the system board assembly 3, and then generates control commands according to predetermined control strategy and execution sequence, sends the control commands to the actuators of the refrigerating plates 11-4 and the cooling fan 13, and sends the processed data to the system board assembly 3 for display.

Hereinafter the components will be described in detail:
Furnace Body 1

The furnace body 1 is a core component of the low-temperature dry block temperature calibrator in the present disclosure, and is used for inserting a temperature element under test for calibration and keeping the temperature uniform and stable.

Figure 3:
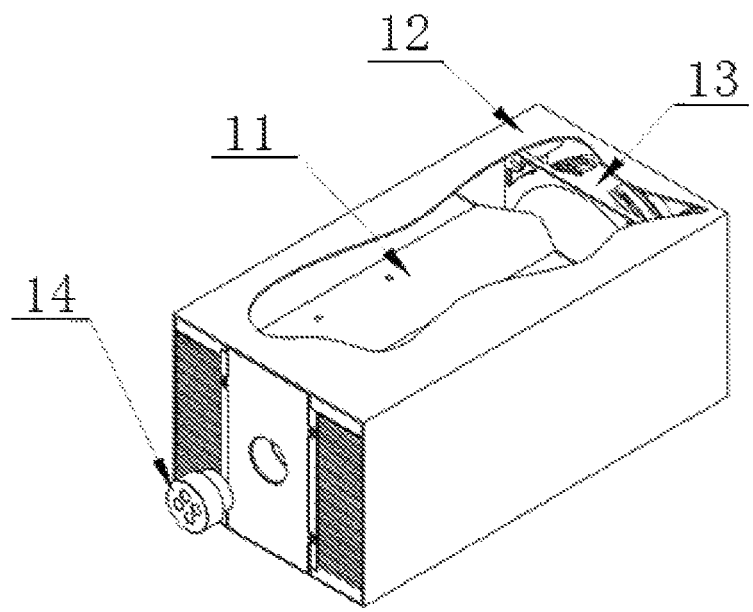
FIG. 3 is a schematic diagram of the structure of the furnace body.

The following reference numbers are used in this part:
11: furnace core, 11-1: radiator, 11-2: foam thermal insulation body, 11-3: thermostatic block, 11-31: arc-shaped surface, 11-32: wide portion, 11-33: narrow portion, 11-4: refrigerating plate, 11-5: sensor group, 11-6: air guide plate, 11-7: soaking block, 11-8: top decorative plate;
12: furnace body bracket, 12-1: coaming, 12-2: side plate, 12-3: mounting clip, 12-4: locking screw hole;
13: cooling fan, 14: furnace opening heat-insulating block;

The furnace body 1 is a core component of the low-temperature dry block temperature calibrator in the present disclosure. As shown in FIG. 3, the furnace body 1 comprises a furnace core 11, a furnace body bracket 12, a cooling fan 13, and a furnace opening heat-insulating block 14. Both the furnace core 11 and the cooling fan 13 are located in the furnace body bracket 12, and the cooling fan 13 is arranged below the furnace core 11, the furnace opening heat-insulating block 14 is positioned at the furnace opening at the upper end of the furnace core 11.

Figure 4A:
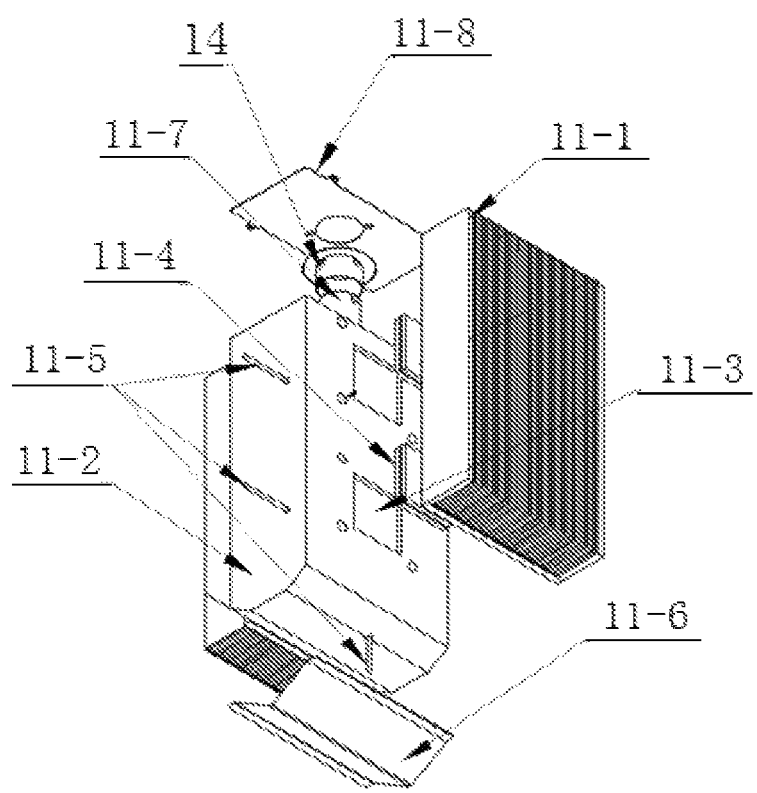
FIG. 4A is a schematic exploded diagram of the structure of the furnace core mounted with the first radiator.
Figure 4B:
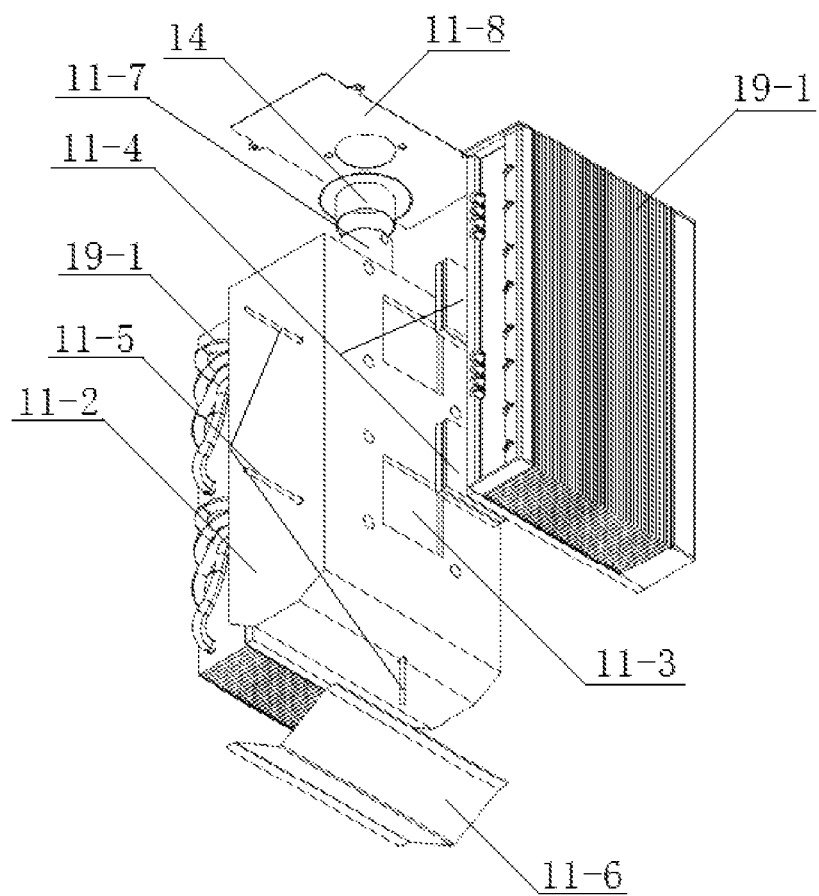
FIG. 4B is a schematic exploded diagram of the structure of the furnace core mounted with the second radiator.
Figure 5:
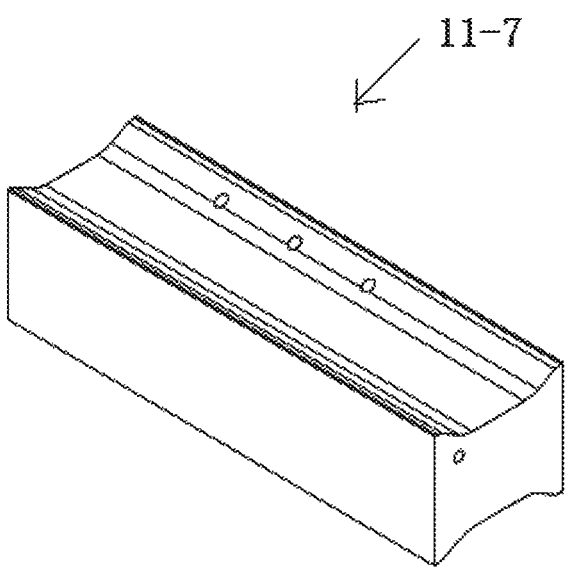
FIG. 5 is a perspective diagram of the soaking block.

FIGS. 4A and 4B show the structure of the furnace core 11. The furnace core 11 comprises radiators, a foam thermal insulation body 11-2, a thermostatic block 11-3, refrigerating plates 11-4, a sensor group 11-5, an air guide plate 11-6 and a soaking block 11-7, wherein the thermostatic block 11-3 is arranged inside the foam thermal insulation body 11-2; both sides of the foam thermal insulation body 11-2 are respectively provided with a plurality of through-holes for mounting the refrigerating plates 11-4, and the foam thermal insulation body 11-2 is also pre-formed with a plurality of sensor mounting via-holes for mounting the sensors of the sensor group 11-5; two radiators are provided and mounted on both sides of the foam thermal insulation body 11-2 respectively. The hot end of the radiator is in contact with the refrigerating plates 11-4 and the radiators may be fixed on the foam thermal insulation body 11-2 by screws. During installation, the pressing force of the radiator is designed in advance to ensure that the radiator is in contact with the refrigerating plates 11-4 while the refrigerating plates 11-4 will not be cracked.

The refrigerating plates 11-4 are embedded into the through-holes on both side walls of the foam thermal insulation body 11-2, and heat-conducting silicone grease or soft heat-conducting gaskets are applied to the side walls that form the through-holes so as to enhance the heat conductivity of the refrigerating plates 11-4. Preferably, the cross-section of the refrigerating plate 11-4 is 40 mm×40 mm. The larger the refrigerating area is, the better the refrigerating effect is.

An open slot with an opening at the top end is arranged in the thermostatic block 11-3, the soaking block 11-7 is placed in the open slot of the thermostatic block 11-3, and the thermostatic block 11-3 provides a temperature environment required by the soaking block 11-7; several blind holes are arranged on the upper part of the soaking block 11-7 to accommodate the temperature element under test. As shown in FIG. 3, the thermostatic block 11-3 is a square-like body, the two opposite surfaces of the thermostatic block 11-3 are configured into concave arc-shaped surfaces 11-31. The cross section of the thermostatic block 11-3 is in an hourglass shape that is wider at the two ends and narrower in the middle, and the two wider sides of the thermostatic block 11-3 are in contact with the refrigerating plates 11-4. With the above structure, the thermostatic block 11-3 has light weight and small thermal capacity, and is sensitive to temperature changes. For the part clamped by the arc-shaped surfaces 11-31 on both sides of the thermostatic block 11-3, the widest parts at both ends are wide portions 11-32, while the narrowest part in the middle is a narrow portion 11-33. The width of the wide portions 11-32 (refers to the length of a line connecting the oppossing positions of the two arc-shaped surfaces 11-31) is in a range of 30 mm to 80 mm, and the width of the narrow portion 11-33 is in a range of 20 mm to 50 mm. Preferably, the width of the wide portions 11-32 is in a range of 40 mm to 60 mm, and the width of the narrow portion 11-33 is in a range of 30 mm to 40 mm. In this embodiment, the width of the wide portions 11-32 is 42 mm, the width of the narrow portion is 31 mm, and then the dimension of the refrigerating plates in contact with the wide portions 11-32 is 40 mm×40 mm. By configuring the thermostatic block 11-3 in the above range, the thermostatic block 11-3 has lighter weight and better sensitivity, and the side where the wide portion 11-32 is located is larger, so that refrigerating plates 11-4 in larger size can be disposed there.

The sensor group 11-5 consists of a plurality of sensing elements including a pair of differential thermocouples, a thermal resistance temperature sensor, and an over-temperature alarm sensor. The sensing elements are respectively mounted in mounting via-holes arranged in the foam thermal insulation body 11-2 of the furnace core 11, and a probe portion of the sensing element is embedded into a temperature measuring hole in the thermostatic block 11-3.

The bottom of the foam thermal insulation body 11-2 is in a V-shaped structure (see FIGS. 4A and 4B). The cross section of the air guide plate 11-6 is in a V-shaped long plate structure, which is overlapped with the V-shaped bottom of the foam thermal insulation body 11-2. The two side edges of the air guide plate 11-6 are respectively fixed to bottom edges of the radiators located on both sides at position near the foam thermal insulation body 11-2. The V-shaped structure of the air guide plate allows cold air to flow to the radiators located on both sides uniformly. In addition, the air guide plate 11-6 also serves as a cable fixing and clamping component of the furnace core 11, so that the wiring is neater and smoother.

In the embodiment shown in FIGS. 4A and 4B, the furnace core 11 further comprises a top decorative plate 11-8, which is arranged at the top of the furnace opening heat-insulating block 14 and connected to the radiators by screws.

Figure 6:
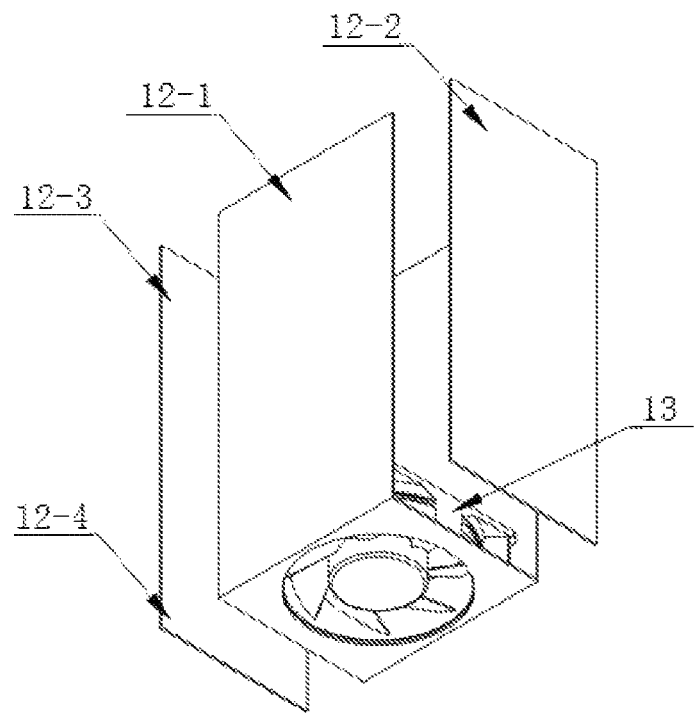
FIG. 6 is a schematic diagram of the structure of the furnace body bracket.

As shown in FIG. 6, the furnace body bracket 12 comprises a coaming 12-1 and side plates 12-2, wherein the bottom of the coaming 12-1 is provided with a cooling fan 13, two side plates 12-2 are provided, and mounting clips 12-3 and locking screw holes 12-4 are arranged on the side plates 12-2. The two side plates 12-2 are respectively mounted on the two sides of the coaming 12-1, and the furnace core 11 is mounted in the furnace body bracket 12. During installation, the furnace core 11 is first fixed on the coaming 12-1, then the side plates 12-2 are respectively mounted on the radiators of the furnace core 11 by means of the mounting clips 12-3, and the side plates 12-2 are fully locked by penetrating screws through the locking screw holes 12-4 of the side plates 12-2.

As shown in FIGS. 3, 4A and 4B, the furnace opening heat-insulating block 14 is placed at the furnace opening so as to prevent heat loss inside the furnace core 11, improve the internal temperature field and reduce energy consumption, as well as to improve the working environment of the operators and prevent scalding. The material of the furnace opening heat-insulating block 14 may be polytetrachloroethylene, which has low thermal conductivity and high temperature resistance.

Figure 7:
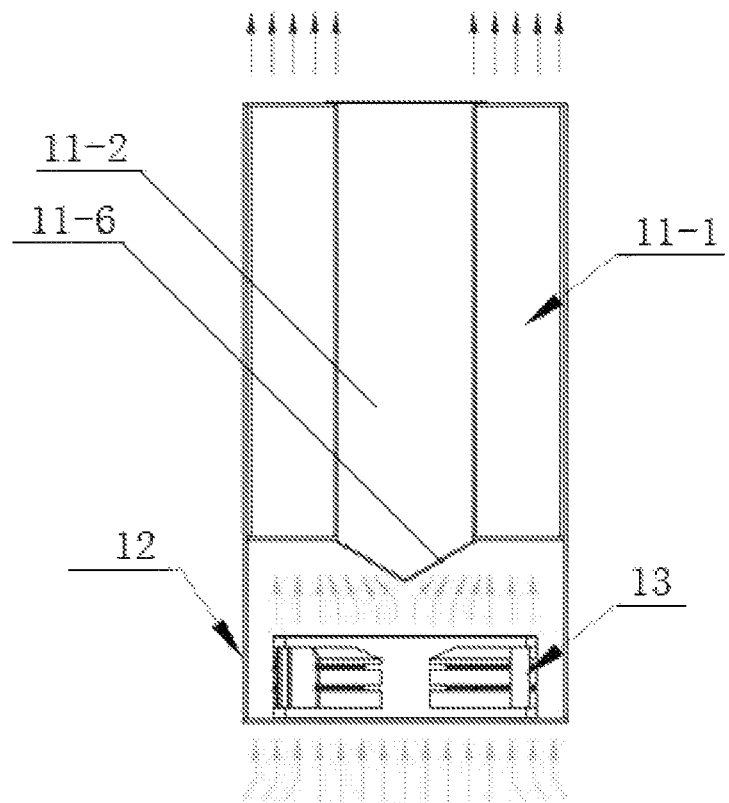
FIG. 7 is a schematic diagram of the airflow channel of the furnace body.

FIG. 7 is a schematic diagram of the air flow channel of the furnace body 11. As shown in FIG. 7, the radiator comprises a plurality of fins arranged in parallel with clearance therebetween. The clearance arranged between the fins serves as airflow channel. The airflow generated by the cooling fan 13 at the bottom of the furnace body is guided to the radiators located on both sides by the air guide plate 11-6, and then passes through the clearance between the fins to the furnace opening. In this process, the radiators achieve a heat dissipation effect. The bottom of the furnace core 11 and the bottom of the furnace body bracket 12 form a static pressure chamber, which is beneficial for uniform distribution of the airflow of the radiators located on both sides. The air guide plate 11-6 in a V-shaped structure serves to shunt the airflow and reduce the airflow resistance.

The above components are assembled according to the above-mentioned connection relationship into a low-temperature furnace body 1 and a low-temperature dry block temperature calibrator comprising the low-temperature furnace body 1 in the present disclosure. The thermostatic block 11-3 in the low-temperature furnace body 1 is cuboid, and its cross section is configured into an hourglass shape that is wider at the two sides and narrower in the middle. With such a structure, the thermostatic block 11-3 has light weight and small thermal capacity, and is sensitive to temperature changes, which is helpful for improving the measurement accuracy of the device under test. In addition, since the two opposite sides of the thermostatic block 11-3 are wider, the refrigerating plates 11-4 arranged on the two sides of the thermostatic block 11-3 are bigger in size and better in heat dissipation effect; the low-temperature dry block temperature calibrator in the present disclosure is in a modular design, the furnace body 1 and other assemblies and components can be disassembled independently from each other, and thus the convenience of production and maintenance is improved effectively and the production and maintenance cost of the product is reduced effectively; the furnace body 1 in the present disclosure has a reasonable structural layout and a compact structure, and employs a design that two airflow channels are sealed independently from each other. Thus, the high-temperature air in the furnace body 1 has no adverse effect on the working environment of other components, and the service life of the electronic components and elements is prolonged; besides, the effect of heat generated by other components on the furnace body 1 is isolated, the working stability of the furnace body 1 and the temperature measurement accuracy are improved.

The radiators may be radiators commonly used in the prior art (e.g., aluminum extrusion radiators). Since aluminum extrusion radiators have thick fins, they have heavy weight under the condition of the same heat dissipation area; since the space in the furnace body is limited, the heat dissipation area of the heat dissipation fins is small; under the same heat dissipation conditions, the heat dissipation efficiency of an aluminum extrusion radiator is low, resulting in poor heat dissipation effect of the dry block temperature calibrator. Therefore, in the present disclosure, two types of radiators with light weight and high heat dissipation efficiency are provided in the present disclosure and are applied in the low-temperature dry block temperature calibrator in the present disclosure. Two types of radiators are used in the embodiment shown in FIG. 4 in the present disclosure. The radiator used in the furnace body 1 in FIG. (a) is a first radiator 11-1, and the radiator used in the furnace body 1 in FIG. (b) is a second radiator 19-1. Hereinafter the two new types of radiators will be described respectively.

First Radiator 11-1

The first radiator 11-1 may be used in the furnace body 1 of the low-temperature dry block temperature calibrator in the present disclosure to timely conduct the heat in the furnace body 1 out.

The following reference numbers are used in this part:
11-1: first radiator, 11-11: set of fins,
11-12: soaking plate, 11-121: flat plate portion, 11-122: boss portion, 11-123: cavity, 11-124: first mounting hole;
11-13: base plate, 11-131: through-slot, 11-132: step, 11-133: second mounting hole;
11-14: left side plate, 11-15: right side plate.

Figure 8:
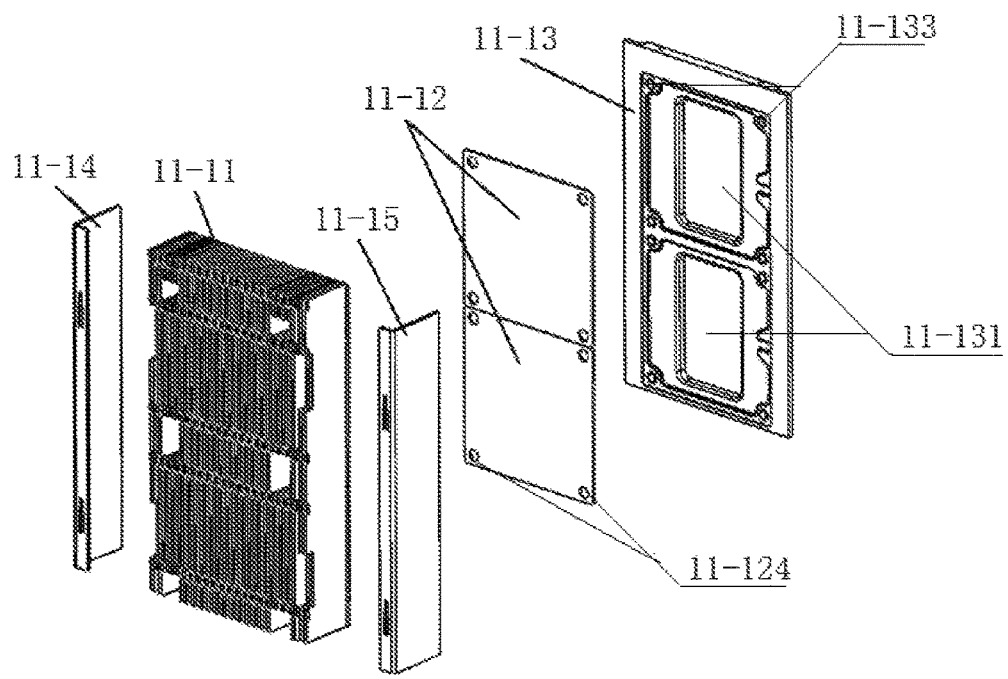
FIG. 8 is a schematic exploded diagram of the structure of the first radiator.

As shown in FIG. 8, the first radiator 11-1 (see FIG. 4) in the present disclosure comprises a set of fins 11-11 formed by a plurality of fins arranged in parallel to and spaced apart from each other, and a soaking plate 11-12 vertically connected to the set of fins, wherein:

The fins are sheet-shaped aluminum foils, which are preferably arranged at equal spacing and vertically to the soaking plate 11-12, and may be connected with the soaking plate 11-12 into a whole by welding, crimping or bonding. The set of fins 11-11 formed by a plurality of fins may cover or partially cover the soaking plate, or may extend beyond the borders of the soaking plate, which may be configured depending on the actual application requirement.

Figure 9:
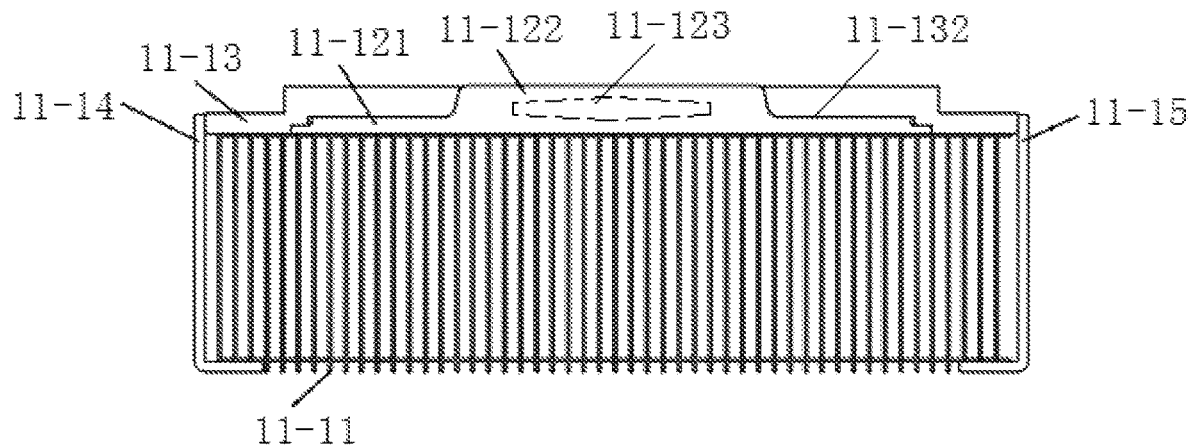
FIG. 9 is a transverse cross-sectional view of the first radiator.

In the embodiment shown in FIGS. 8 and 9, the soaking plate 11-12 comprises a flat plate portion 11-121, which is a square flat plate, one side of the flat plate portion 11-121 is tightly attached and fixed to the set of fins 11-11 and the other side of the flat plate portion 11-121 extends outwards and forms a boss portion 11-122. The cross-sectional shape of the boss portion 11-122 is not limited (e.g., it may be a polygonal, circular or irregular shape). A cavity 11-123 is arranged inside the boss portion 11-122 and filled with a cooling medium (preferably a cooling liquid, such as water), and the inner surface of the cavity has a porous structure (e.g., a copper powder sintered layer), which is helpful for forming a cooling cycle.

The first radiator 11-1 in the present disclosure comprises at least one soaking plate 11-12, preferably comprises a plurality of soaking plates 11-12. A plurality of soaking plates 11-12 is applicable for a plurality of distributed heat sources. The plurality of soaking plates may concentrate the heat of the distributed heat sources and the heat is conducted out via the set of fins 11-11 connected with the soaking plates, and thereby the heat dissipation effect is improved. In the embodiment shown in FIG. 8 in the present disclosure, the first radiator 11-1 comprises two soaking plates 11-12.

Figure 2:
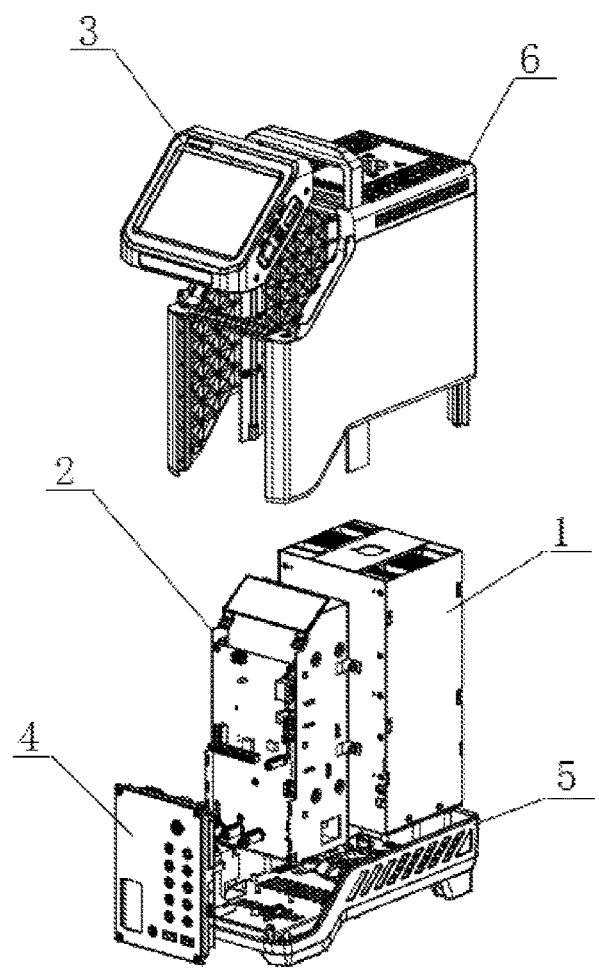
FIG. 2 is a schematic exploded diagram of the structure of the low-temperature dry block temperature calibrator according to the present disclosure.

As shown in FIGS. 8 and 9, the first radiator 11-1 further comprises a base plate 11-13 fixedly connected to the soaking plates 11-12. The base plate 11-13 is provided with one or more through-slots 11-131 that match the boss portions 11-122 of the soaking plates 11-12 in shape, size and position, so that the boss portions 11-122 are embedded in the through-slots 11-131 of the base plate 11-13. In the embodiment shown in FIG. 1, the base plate 11-13 is provided with two square through-slots 11-131, which extend to the side away from the set of fins 11-11 in a direction perpendicular to the base plate 11-13, and have an aperture that is wider at the front side and narrower at the back side (i.e., wider at the lower part and narrower at the upper part, as shown in FIG. 2) and thus forms a step 11-132; the boss portion 11-122 of the soaking plate 11-12 is embedded into the portion of the through-slot 11-131 with narrower aperture, while the flat plate portion 11-121 is embedded into the portion of the through-slot 11-131 with wider aperture, and the base plate 11-13 and the soaking plate 11-12 are fixedly connected into a whole The first radiator 11-1 in the present disclosure further comprises an outer frame consisting of a left side plate 11-14 and a right side plate 11-15, wherein the two side plates are parallel to the fins in the set of fins 11-11 and wrap the set of fins 11-11 at the two ends of the set of fins 11-11, and are welded to the set of fins 11-11 to form an enclosure to protect the set of fins 11-11, and are connected with other components to encapsulate the components of the first radiator 11-1 into a whole.

The first radiator 11-1 is mounted in the furnace body 1 of the low-temperature dry block temperature calibrator. In the embodiment shown in FIG. 4A, two first radiators 11-1 are provided and respectively disposed on both sides of the foam thermal insulation body 11-2 and fixed to the foam thermal insulation body 11-2 by screws; the refrigerating plates 11-4 are embedded into the through-slots arranged in the two side walls of the foam thermal insulation body 11-2, one side of the refrigerating plates is in contact with the thermostatic block 11-3, and the other side of the refrigerating plates is in contact with the first radiators 11-1. The furnace body bracket 12 is arranged outside the first radiators 11-1, and the first radiators 11-1 are fixed to the furnace body bracket 12 by mechanical connections (e.g., a combination of threaded connection and snap-fitting). To mount the first radiators 11-1 to the foam thermal insulation body 11-2, first mounting holes 11-124 are provided at the four corners of the soaking plates 11-12, second mounting holes 11-133 are provided on the periphery of the through-slots 11-131 of the base plate 11-13. The first mounting holes 11-124 are aligned with the second mounting holes 11-133, and the fins of the set of fins 11-11 at positions corresponding to the second mounting holes 11-133 of the base plate 11-13 are removed, which is convenient to mount the radiators 11-1 on the foam thermal insulation body 11-2.

The above components are assembled in the above-mentioned relationship into the first radiators in the present disclosure. The end of the base plate 11-13 and the soaking plate 11-12 close to the set of fins 11-11 is defined as a cold end, while the other end of the base plate 11-13 and the soaking plate 11-12 is defined as a hot end, the hot end contacts the refrigerating plates in the furnace body of the dry block temperature calibrator, and the cold end is connected with the set of fins 11-11. Since the vacuum cavity of the soaking plate 11-12 is fully filled with a cooling medium, when the hot end of the soaking plate 11-12 contacts a heat source, the cooling medium is heated and vaporized, the vapor flows to the cold end under slight pressure difference and releases heat, thus the vapor condenses into liquid, and the liquid flows back to the hot end along the porous material of the inner surface of the cavity under the action of capillary force. In that way, the heat is transferred from the hot end of the soaking plate 11-12 to the cold end (the end of the set of fins), and then is dissipated by the set of fins 11-11. At the same time, an air cooling effect is achieved since the spaces between the plurality of fins in the set of fins 11-11 are configured for ventilation. Therefore, the radiator employs a combination of soaking plate for quick heat conduction and fins for quick heat dissipation, and thereby has high heat dissipation efficiency.

The embodiment of the first radiator comprising a plurality of soaking plates 11-12 in the present disclosure is applicable to a plurality of dispersed heat sources, and the embodiment can concentrate the heat of the distributed heat sources and conduct out the heat by means of the set of fins 11-11, and thereby the heat dissipation effect is improved; the fins in the set of fins have small thickness and small spacing (e.g., the fins made of aluminum foil may have 0.4 mm thickness and 2.3 mm spacing), and are light in weight. Compared with an aluminum extrusion radiator in the same volume, the weight may be reduced by 23% to 40% and the heat dissipation efficiency is improved; the soaking plate 11-12 has high heat conductivity. Compared with an aluminum extrusion radiator under the same conditions, the soaking plate can quickly transfer the heat of the heat source at the hot end (the heat of the refrigeration plate) to the set of fins 11-11, thus attaining a better heat dissipation effect.

Since the first radiator 11-1 in the present disclosure is light in weight, the low-temperature dry block temperature calibrator utilizing the radiator is lighter in weight and more portable; since the soaking plate of the first radiator 11-1 and the refrigerating plates 11-4 in the furnace body 1 in the present disclosure correspond to each other in position and contact each other, the heat of the furnace body 1 can be transferred to the first radiator 11-1 in time; moreover, since the fins of the first radiator 11-1 in the present disclosure are thin and have large spacing and the ventilation area among the plurality of fins is larger, the radiator has lower air resistance and improved ventilation amount. Therefore, a low-temperature dry block temperature calibrator utilizing the first radiator 11-1 has lower noise and higher heat dissipation performance during operation, and the duration of the cooling process of the low-temperature dry block temperature calibrator utilizing the first radiator is significantly reduced.

Second Radiator 19-1

The second radiator 19-1 may also be used in the furnace body 1 of the low-temperature dry block temperature calibrator in the present disclosure to timely conduct the heat in the furnace body 1.

The following reference numbers are used in this part:
19-1: second radiator;
19-11: a set of heat dissipation fins, 19-111: first semi-circular concave strip, 19-112: second circular hole;
19-12: U-shaped thermo-tube, 19-121: first side arm, 19-122: second side arm, 19-123: connecting section;
19-13: heat conducting plate, 19-131: second semi-circular concave strip, 19-132: third mounting hole;
19-14: first side plate, 19-141: fixing plate, 19-142: second semi-circular opening, 19-143: circular through-hole;
19-15: second side plate.

Figure 10:
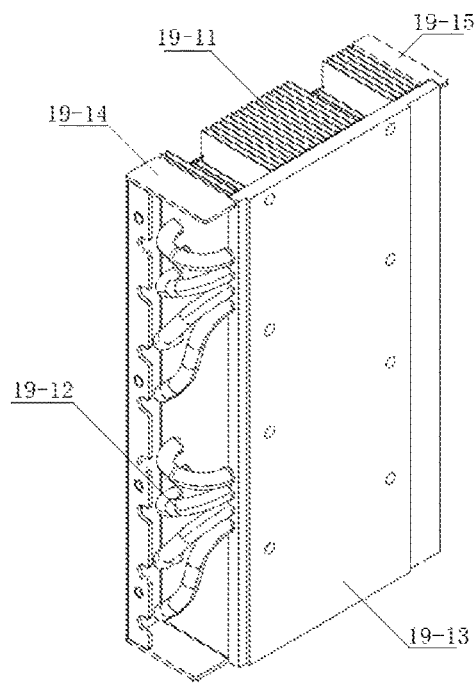
FIG. 10 is a schematic perspective diagram of the structure of the second radiator.
Figure 11:
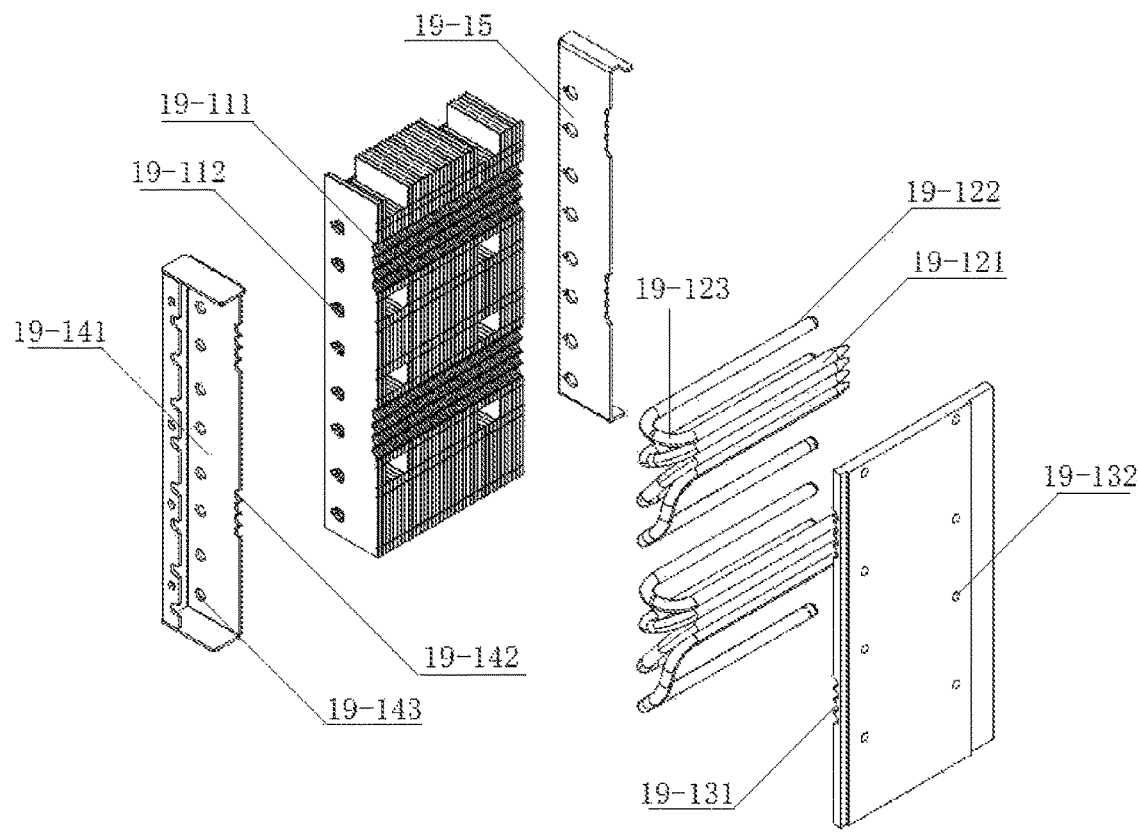
FIG. 11 is a schematic exploded diagram of the structure of the second radiator.

In the embodiment shown in FIG. 10, the second radiator 19-1 (see FIG. 4B) in the present disclosure comprises a set of heat dissipation fins 19-11 formed by a plurality of heat dissipation fins arranged in parallel to and spaced apart from each other, U-shaped thermo-tubes 19-12, a first side plate 19-14, a second side plate 19-15, and a heat conducting plate 19-13, wherein the first side plate 19-14 and the second side plate 19-15 are respectively vertically arranged on the both sides of the heat conducting plate 19-13 to form into a rectangular slot structure, the heat conducting plate 19-13 is located at the bottom of the slot structure, the set of heat dissipation fins 19-11 are arranged inside the slot structure, and each heat dissipation fin is parallel to the first side plate 19-14 and the second side plate 19-15 located on both sides, wherein:

As shown in FIG. 11, the first side plate 19-14 comprises a rectangular fixing plate 19-141 closely attached to the set of heat dissipation fins 19-11, a plurality of second semi-circular openings 19-142 are provided on an end surface of the fixing plate 19-141 adjacent to the heat conducting plate 19-13, and the quantity of the second semi-circular openings 19-142 is consistent with the quantity of the U-shaped thermo-tubes. In this embodiment, eight second semi-circular openings 19-142 are provided, and every four adjacent second semi-circular openings 19-142 are grouped into one group, and the two groups of second semi-circular openings 19-142 are disposed with a certain spacing from each other; the other three sides of the fixing plate 19-141 extend outwards vertically to form a folded edge respectively, for the purpose of blocking airflow such that the airflow passes through the set of heat dissipation fins 19-11 of the radiator 19-1 and is prevented from reaching the side of the fixing plate 19-141, and facilitating the installation of the radiator 19-1 in the furnace body 01 (see FIG. 4B, the radiator 19-1 may be fixed on the filling foam 19-13 by penetrating screws through the folded edges of the fixing plate 19-141); the other side of the fixing plate 19-141 away from the heat conducting plate 19-13 is provided with a plurality of circular through-holes 19-143 distributed with equal intervals, and the quantity of the circular through-holes 19-143 is consistent with the quantity of the U-shaped thermo-tubes 19-12. In this embodiment, eight circular through-holes 19-143 are also provided. The structure of the second side plate 19-15 is same as that of the first side plate 19-14, and the two side plates are arranged symmetrically.

A plurality of parallel concave strips are arranged on a side of the heat conducting plate 19-13 that is closely attached to the set of heat dissipation fins 19-11, and the cross sections of the concave strips are all in a semi-circular shape, i.e., the concave strips are second semi-circular concave strips 19-131. In the embodiment shown in FIGS. 10 and 11, eight second semi-circular concave strips 19-131 are provided (corresponding to the quantity of the U-shaped thermo-tubes 19-12), and are arranged in two groups spaced apart from each other with certain spacing, and every four second semi-circular concave strips 19-131 are adjacent to each other and configured as a group. The heat conducting plate 19-13 is also provided with a plurality of third mounting holes 19-132 penetrating the heat conducting plate 19-13 in the thickness direction for mounting the second radiator 19-1 in the present disclosure on other components, for example, mounting in the furnace body 1 of the low-temperature dry block temperature calibrator by screws.

The heat dissipation fins are sheet-shaped aluminum foils, and the plurality of heat dissipation fins are preferably arranged in parallel to each other and spaced from each other with equal spacing, and the plurality of heat dissipation fins form a set of heat dissipation fins 19-11; each heat dissipation fin at a position close to the second semi-circular concave strip 19-131 of the heat conducting plate 19-13 is provided with a first semi-circular opening, and a plurality of first semi-circular openings at the same horizontal position form the first semi-circular concave strip 19-111; the second semi-circular concave strip on the heat conducting plate 19-13, the first semi-circular concave strip 19-111 of the set of heat dissipation fins 19-11, and the second semi-circular openings 19-142 of the fixing plates 19-141 located on both sides are aligned and combined to form complete circular holes, which are defined as first circular holes. A plurality of circular holes arranged with equal spacing on the side of the set of heat dissipation fins 19-11 that is away from the heat conducting plate 19-13, which are defined as second circular holes 19-112. The heat dissipation fins in the set of heat dissipation fins 19-11 at positions corresponding to the third mounting holes 19-132 on the heat conducting plate 19-13 are removed to facilitate the mounting and fixing of the second heat radiator 19-1 in the present disclosure.

The quantity and specific structure of the U-shaped thermo-tubes 19-12 may be set according to the actual requirement. In the embodiment shown in FIGS. 10 and 11, eight U-shaped thermo-tubes 19-12 are provided and grouped into two groups. Every four adjacent U-shaped thermo-tubes 19-12 serve as a group, and each U-shaped thermo-tube 19-12 comprises a first side arm 19-121 and a second side arm 19-122 that are arranged in parallel to each other and a connecting section 19-123 connecting the first side arm and the second side arm. Each U-shaped thermo-tube 19-12 has a cavity therein, the cavity is filled with a cooling medium (preferably a cooling liquid, such as water), and the inner surface of the cavity is a porous structure (e.g., a copper powder sintered layer), which is helpful for forming a cooling cycle; the first side arms 19-121 of each group of U-shaped thermo-tubes 19-12 are tightly attached to each other, while the second side arms spaced from each other with equal spacing. Such a design helps to conduct the heat of the hot end of the radiator 19-1 concentratedly and dissipate the heat distributedly, thus improving the heat dissipation effect.

During installation, the first side arms 19-121 of the U-shaped thermo-tubes 19-12 respectively pass through the first circular holes formed by the set of heat dissipation fins 19-11, the heat conducting plate 19-13 and the fixing plates 19-141 located on both sides. The second side arms 19-122 pass through the second circular holes 19-112 of the set of heat dissipation fins 19-11, and the U-shaped thermo-tubes 19-12 are embedded into the set of heat dissipation fins 19-11 and the heat conducting plate 19-13, thereby the space occupation of the radiator is saved. The U-shaped thermo-tubes 19-12 work with the set of heat dissipation fins 19-11 together to dissipate heat, and thereby the heat dissipation effect is improved.

The above components are assembled in the above-mentioned relationship into the second radiator 19-1 in the present disclosure, and the set of heat dissipation fins 19-11 may be connected with the heat conducting plate 19-13, the first side plate 19-14, and the second side plate 19-15 into a whole by welding, crimping, or bonding. During use, the heat conducting plate 19-13 is close to or contacts the heat source, and the heat emitted by the heat source is conducted out through the joint action of U-shaped thermo-tubes 19-12 and the set of heat dissipation fins 19-11, thereby a heat dissipation effect is achieved.

The heat dissipation fins of the second radiator 19-1 in the present disclosure are made of aluminum foil, and have small thickness and light weight, thus the overall weight of the radiator is reduced; the U-shaped thermo-tubes 19-12 of the second radiator are made of copper. Therefore, the dissipation power of the radiator is as high as 200 W to 300 W, which is about two times of that of an aluminum extrusion radiator.

The second radiator 19-1 in the present disclosure is used in the furnace body 1 of the low-temperature dry block temperature calibrator. In the embodiment shown in FIG. 4B, two second radiators 19-1 are provided and respectively disposed on both sides of the foam thermal insulation body 11-2 and fixed to the foam thermal insulation body 11-2 by screws; the refrigerating plates 11-4 are embedded into the through-slots arranged in the two side walls of the foam thermal insulation body 11-2, one side of the refrigerating plates is in contact with the thermostatic block 11-3, and the other side of the refrigerating plates is in contact with the second radiators 19-1.

The quantity of the refrigerating plates 11-4 may be set as required. In the embodiment shown in FIG. 4B, the refrigerating plates 11-4 are grouped into two groups and are arranged oppositely on both sides of the thermostatic block 11-3, and respectively contact the heat conducting plates 19-13 of the two second radiators 19-1. Preferably, the positions of the refrigerating plates 11-4 correspond to the positions of the first side arms 19-121 of the U-shaped thermo-tubes 19-12, so that the refrigerating plates 11-4 can quickly transfer the heat emitted by the thermostatic block 11-3 to the second radiators 19-1 and then the heat can be quickly conducted out by the second radiators 19-1.

The above embodiment is only an example of the low-temperature dry block temperature calibrator, and the present disclosure is not limited to the embodiment. The radiators 19-1 in the present disclosure may be applied to other dry block temperature calibrators, and the heat dissipation effect can be realized, as long as the heat conducting plate 19-13 of the radiator 19-1 is close to or contacts the heat source of the dry block temperature calibrator.

Since the second radiator in the present disclosure is light in weight, the low-temperature dry block temperature calibrator utilizing the second radiator is lighter in weight and more portable; the heat dissipation power of the second radiator in the present disclosure is as high as 200 W to 300 W, thus the duration of the cooling process of the low-temperature dry block temperature calibrator utilizing the second radiator is significantly reduced.

Control Board Assembly 2

In the low-temperature dry block temperature calibrator, the control board assembly 2 is equivalent to the brain of the low-temperature dry block temperature calibrator, and is used for controlling a stable temperature environment, receiving, analyzing and processing the data collected by each sensor, and controlling the execution of the actions of the electrical components.

Figure 12:
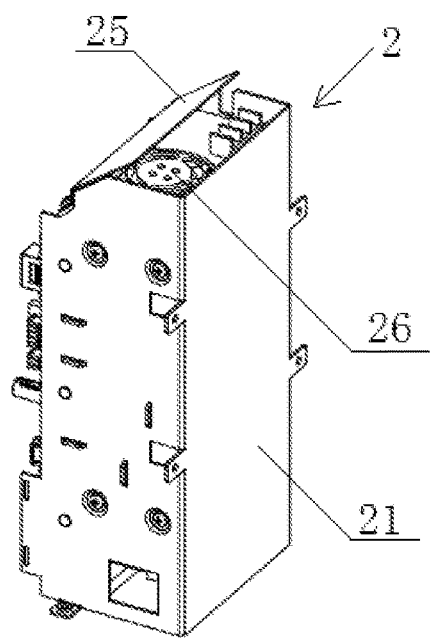
FIG. 12 is a perspective diagram of the structure of the control board assembly.
Figure 13:
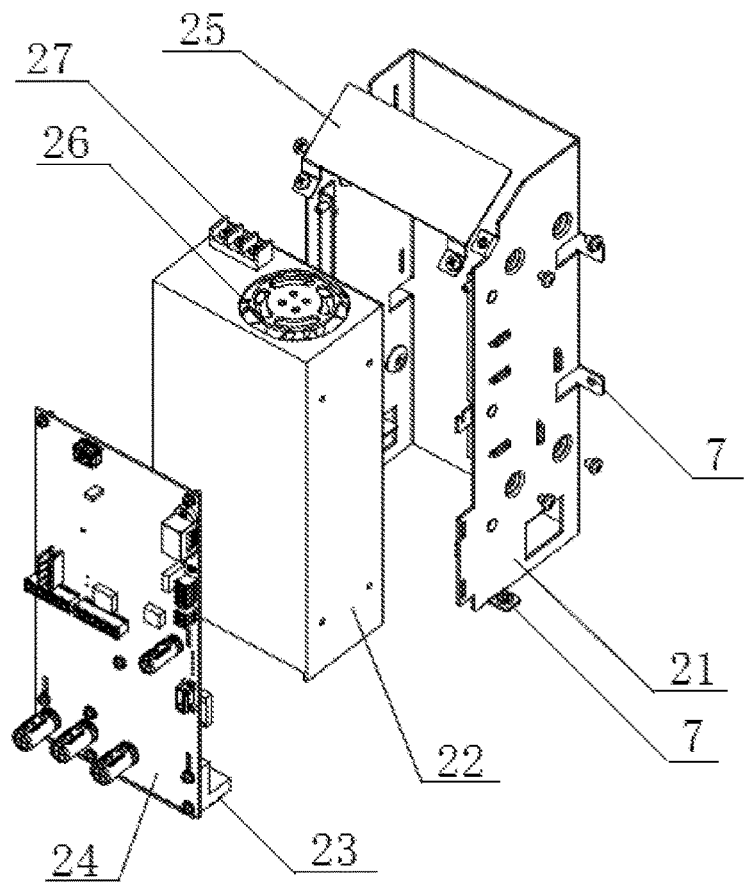
FIG. 13 is a schematic exploded diagram of the structure of the control board assembly.

As shown in FIGS. 12, 13 and 2, one side of the control board assembly 2 is adjacent to the furnace body 1 and fixed on the furnace body bracket 12 of the furnace body 1, and the bottom of the control board assembly 2 is fixed on the base 5. The control board assembly 2 comprises a control board bracket 21, a switching power supply 22 and a control board 24, wherein the cross section of the control board bracket 21 is in a U-shaped slot structure, the switching power supply 22 (e.g., ESP-120-24 switching power supply) is arranged and fixed in the U-shaped slot formed by the control board bracket 21. The lower part of one side of the control board 24 is provided with a heat dissipation block 23, and the bottom surface of the heat dissipation block 23 contacts the base 5, the part of the base 5 contacting the bottom surface of the heat dissipation block 23 is provided with ventilation slots 51 (see FIG. 23); preferably, the heat dissipation block 23 is a metal block with high thermal conductivity; the control board 24 is fixed at the U-shaped opening of the control board bracket 21, and one side of the control board 24 on which the heat dissipation block 23 is mounted faces the switching power supply 22; the top of the switching power supply 22 is provided with a flow guide fan 26 and a power connection terminal 27, and the switching power supply 22 is externally connected with a power supply wire via the power connection terminals 27 to rectify the voltage of the external power supply into a stable voltage and supply power to the entire low-temperature dry block temperature calibrator; a flow guide plate 25 is titled and fixed at the top of the control board bracket 21 and is positioned on top of the switching power supply 22. The purpose of such an arrangement is to guide the exhaust air of the flow guide fan 26 so that the exhaust air of the flow guide fan 26 is exhausted through the heat dissipation holes 62 in the upper housing 6.

In order to facilitate the installation of the control board assembly 2 in the low-temperature dry block temperature calibrator, one or more horizontally arranged assembling parts 7 are provided at the lowermost end of the slot body of the control board bracket 21, and the mounting holes of the assembling parts 7 are aligned with the mounting holes on the base 5, so that the control board assembly 2 is fixed on the base 5 by mounting screws; in addition, a plurality of assembling parts 7 extend on the bottom surface of the slot body of the control board bracket 21, and are aligned with the assembling parts 7 on the outer side of the adjacent furnace body 1, so that the control board assembly 2 is fixedly connected with the furnace body 1 by mounting screws.

The switching power supply 22 is used as a power supply for the entire low-temperature dry block temperature calibrator and supplies power to other components. In view that the switching power supply 22 tends to generate heat in the working process, it is confined in a space formed by the control board bracket 21 and the control board 24 and is isolated from the furnace body 1 to alleviate the effect of the heat generated by the switching power supply 22 on the furnace body 1. Besides, a part of the heat generated by the lower part of the switching power supply 22 is conducted out by the heat dissipation block 23 mounted on the control board 24 through the ventilation slots 51 of the base 5, and the heat generated by the upper part is dissipated while the airflow generated by the flow guide fan 26 passes through the heat dissipation holes 62 in the upper housing 6 under the guide of the flow guide plate 25.

In the control board assembly 2, due to the cooperation between the flow guide plate 25 and the flow guide fan 26, the airflow generated by the flow guide fan 26 is exhausted through the heat dissipation holes 62 in the upper housing 6 in the direction of the flow guide plate 25, thereby the air inside the control board assembly 2 is driven to flow, and external air can also be introduced from the space below the control board assembly 2 (the base 5 under the control board assembly 2 is provided with ventilation slots 51), thereby heat dissipation for peripheries of the control board assembly 2, the adjacent furnace body 1 and the like is realized.

The control board 24 is provided with a processor, processing circuits, various electrical interfaces, communication interfaces and the like. The refrigerating plates 11-4, the cooling fan 13, the sensor group 11-5 in the furnace body 1, the system board assembly 3 and the measurement board assembly 4 are electrically connected with the control board 24. The control board 24 receives, analyzes and processes the temperature data collected by the sensor group 11-5, the parameters set by the system board assembly 3, and the electrical signals measured by the measurement board assembly 4, and then generates control commands and sends the control commands to the actuators of the cooling fins 11-4 and the cooling fan 13 in the furnace body 1 so as to control the temperature of the furnace core 11, and sends the processed data to the system board assembly 3 at the same time for display. The control board 24 is provided with Bluetooth and Wi-Fi assemblies and can carry out wireless communication with other wireless terminals.

System Board Assembly 3

Figure 14:
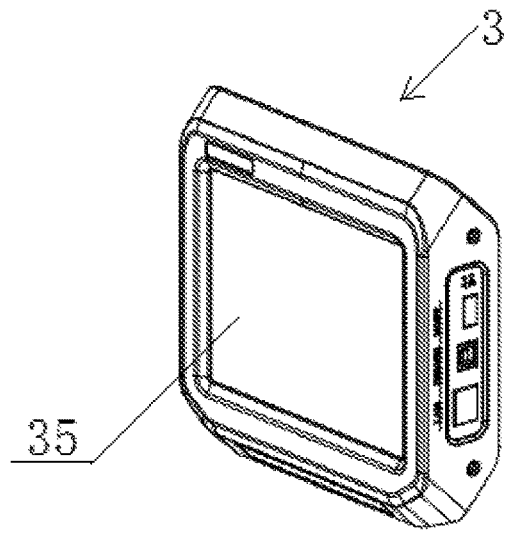
FIG. 14 is a schematic perspective diagram of the structure of the system board assembly.
Figure 15:
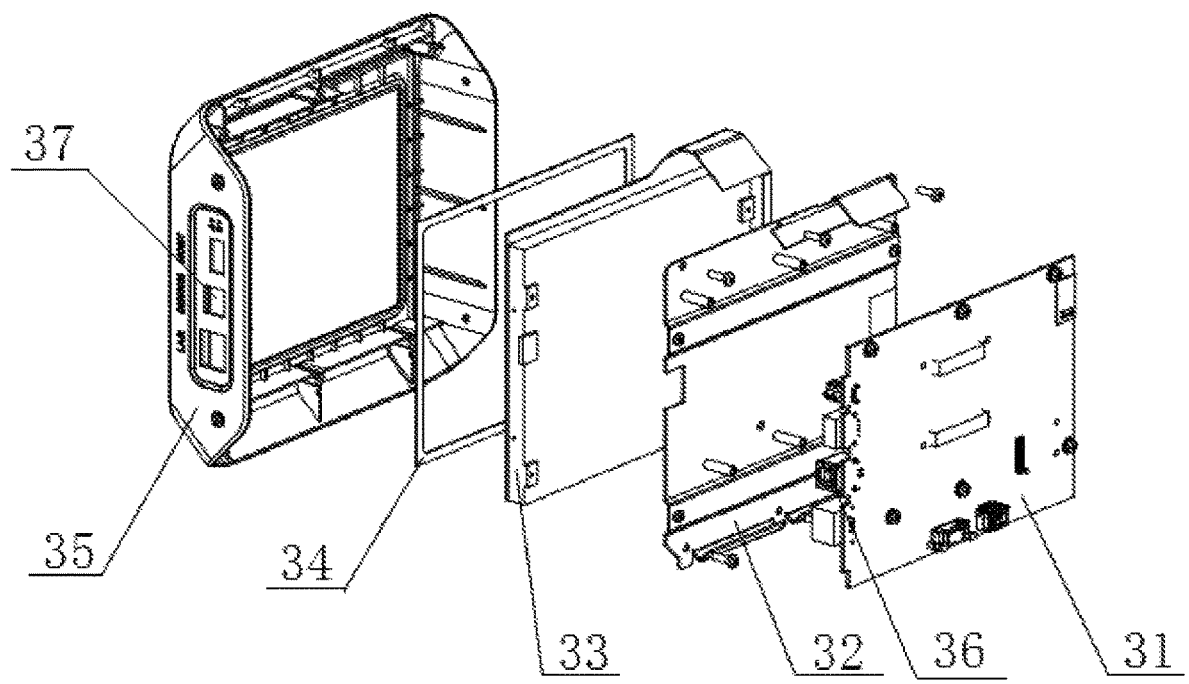
FIG. 15 is a schematic exploded diagram of the structure of the system board assembly.

In the low-temperature dry block temperature calibrator, the system board assembly 3 is mainly used for parameter setting and data and result display, in order to realize human-machine interaction. The system board assembly 3 is in a modular design. As shown in FIG. 2, the system board assembly 3 is mounted above the flow guide plate 25 of the control board assembly 2 of the low-temperature dry block temperature calibrator, fixed on the shell 61 of the upper housing 6, and arranged titledly to facilitate the operator to observe and operate. The structure of the system board assembly 3 is shown in FIGS. 14 and 15. The system board assembly 3 comprises a touch screen panel 35, a touch screen foam 34, a touch LCD 33, a touch LCD bracket 32, and a system board 31, which are arranged from front to back sequentially, wherein the touch screen panel 35 is in a cover shape, and a cover surface of the touch screen panel 35 is provided with an assembling area that matches the touch LCD 33 in shape and size; one or more connection ports 36 are arranged on a side of the system board 31, interface holes 37 are reserved on the corresponding side of the touch screen panel 35, and the connection ports 36 are mounted corresponding to the interface holes 37; the touch screen foam 34, the touch LCD 33, the touch LCD bracket 32 and the system board 31 are sequentially stacked and assembled into the cover body of the touch screen panel 35 as a whole and thereby a system board module 3 is formed. The left and right side surfaces of the system board module 3 are respectively connected with the shell 61 of the upper housing 6 by screws, so that the system board module 3 is detachably mounted on the upper part of the front side surface of the upper housing 6.

Measurement Board Assembly 4

Figure 16:
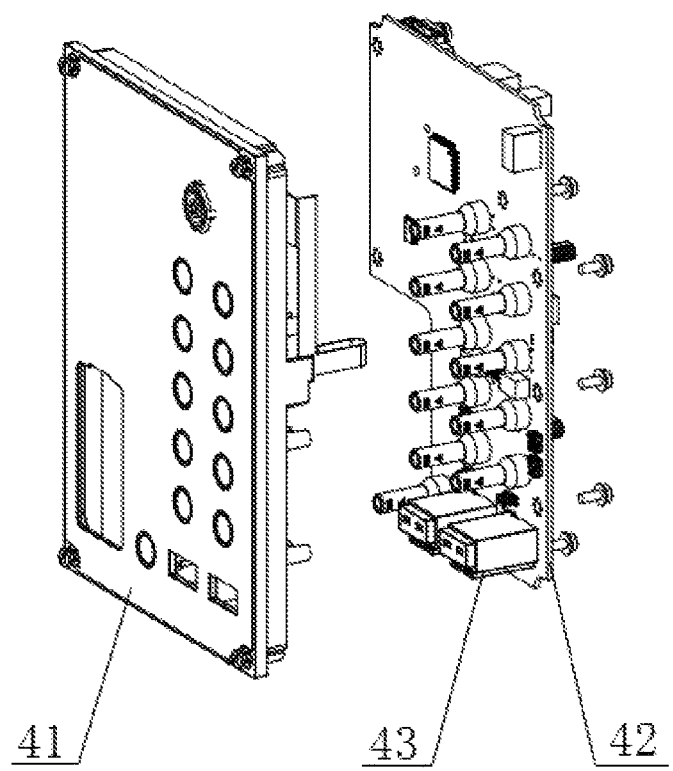
FIG. 16 is a schematic exploded diagram of the structure of the measurement board assembly.
Figure 17:
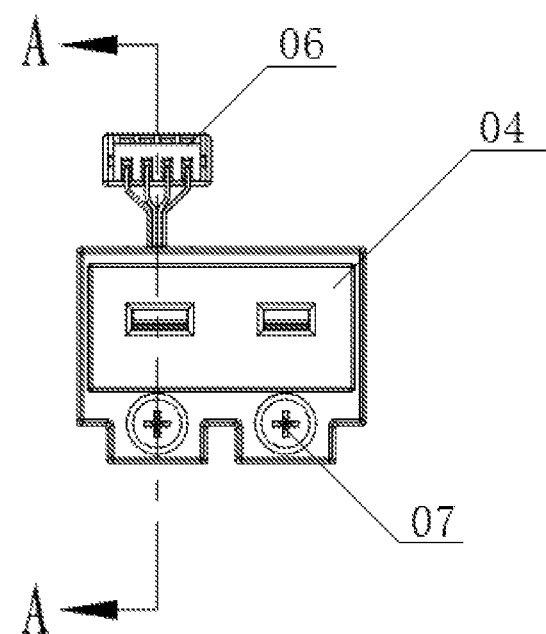
FIG. 17 is a front view of the thermocouple cold-end temperature compensation structure.
Figure 18:
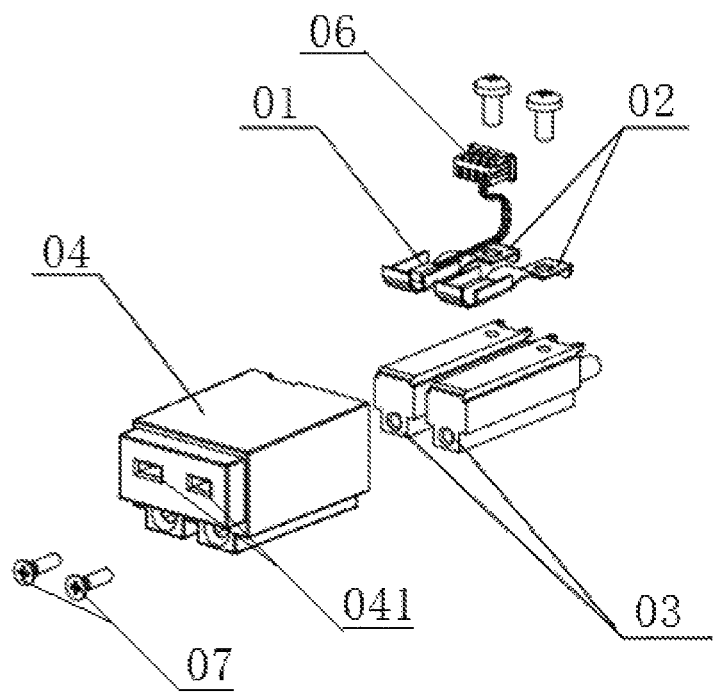
FIG. 18 is an exploded diagram of the structure of the thermocouple cold-end temperature compensation structure.
Figure 19:
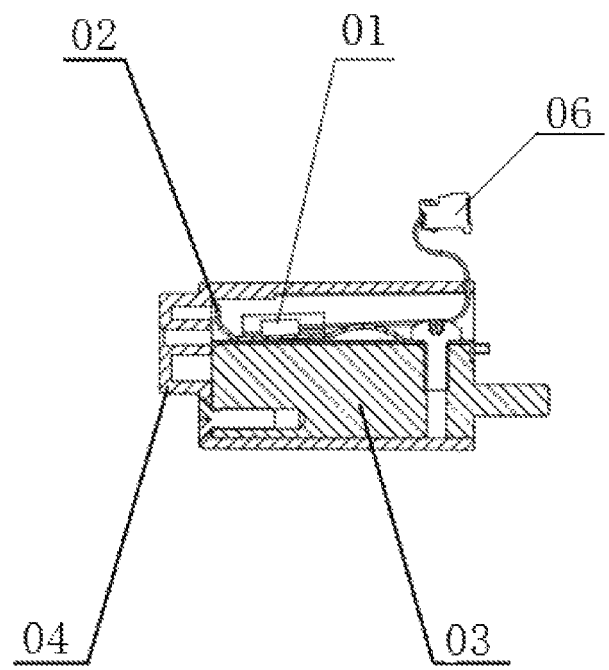
FIG. 19 is a cross-sectional view taken along line A-A in FIG. 17.

In the low-temperature dry block temperature calibrator, the measurement board assembly 4 is mainly used for connecting measurement wires. In the present disclosure, the measurement board assembly 4 is in a modular design. As shown in FIG. 2, the measurement board assembly 4 is mounted at the front side of the control board assembly 2, and the bottom of the measurement board assembly 4 is fixed to the base 5. As shown in FIG. 16, the measurement board assembly 4 comprises a front panel 41 and a measurement board 42, wherein the measurement board 42 is provided with a TC socket element (a thermocouple cold-end temperature compensation structure) 43 and a plurality of test connection terminals. The front panel 41 and the measurement board 42 are superposed in alignment and fixed on the periphery to form the measurement board assembly 4. The test connection terminals of the measurement board 42 protrude from terminal holes provided on the front panel 41. The top of the measurement board assembly 4 is fixed to the shell 61 of the upper housing 6 by screws, and the measurement board assembly 4 is disposed in front of the control board assembly 2 with certain spacing from the control board assembly 2 to facilitate heat dissipation. As shown in FIG. 1, the front panel 41, the touch screen panel 35 of the system board assembly 3, the upper housing 6 and the base 5 encapsulate the low-temperature dry block temperature calibrator in the present disclosure into a whole.

Figure 20:
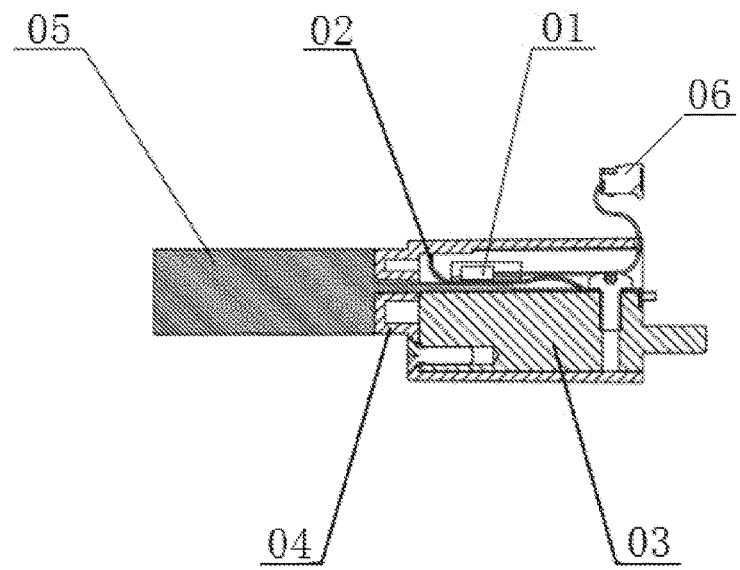
FIG. 20 is a schematic diagram of the structure of the thermocouple cold-end temperature compensation structure working with a thermocouple.

To measure the temperature of the thermocouple accurately, as shown in FIG. 16, the measurement board assembly 4 is integrated with a TC socket element 43, i.e., a thermocouple cold-end temperature compensation structure 43, which is fixed to the measurement board 42 by screws provided at the tail thereof, and two sockets 041 at the front end of the TC socket element 43 are aligned to the jacks on the front panel 41, and a thermocouple can be inserted through the jacks (see FIG. 20). The existing thermocouple cold-end compensation structure employs a scheme: a temperature equalizing block is placed in a cold-end heat-insulating compartment, and the cold-end temperature sensor and the cold end of the thermocouple are tightly attached to the temperature equalizing block. In such a structure, owing to the thermal resistance existing between the cold end of the thermocouple and the temperature equalizing block, the user has to wait a long time till the temperature difference between the cold-end temperature sensor on the temperature equalizing block and the cold end of the thermocouple is reduced, especially when thermocouples are measured in batch. the efficiency is low. To solve the above problem, the present disclosure integrates a thermocouple cold-end temperature compensation structure in the measurement board assembly 2 for measuring the temperature of the cold end of the thermocouple quickly, and the structure can make the temperature of the cold end of the thermocouple 05 consistent with the temperature of the cold-end temperature sensor 01 in a shorter time, thus improves the efficiency of temperature measurement of the cold end of the thermocouple.

FIGS. 17-20 are schematic diagrams of the thermocouple cold-end temperature compensation structure in the present disclosure. As shown in FIGS. 17-20, the thermocouple cold-end compensation structure comprises a cold-end temperature sensor 01, an elastic plate 02 and second soaking blocks 03, wherein the second soaking blocks 03 are heat conductors with large thermal capacity, and two second soaking blocks 03 are provided and spaced from each other; the elastic plates 02 are elastomer with small thermal capacity and good thermal conductivity, and two elastic plates 02 are provided and respectively fixed on the two second soaking blocks 03. The elastic plate 02 is designed into an S-shaped structure, and the tail end (at the right side in FIG. 19) of the elastic plate 02 is fixed on the tail part of the second soaking block 03; the head end of the elastic plate 02 rises up, and the part of the elastic plate 02 near the head end is freely placed on the upper surface of the second soaking block 03. Owing to the elasticity of the elastic plates 02, the cold end of the thermocouple 05 can be inserted into the position between the elastic plates 02 and the second soaking blocks 03 from the head end of the elastic plate 02 (see FIG. 20). The cold-end temperature sensor 01 has characteristics of small size and low thermal capacity, and can be mounted above either elastic plate 02 to measure the temperature of the cold-end of the thermocouple 05. Preferably, thermal conductive adhesive may be applied between the two second soaking blocks 03 to facilitate heat transfer between the two second soaking blocks 03 and to ensure that the temperatures of the two second soaking blocks 03 are kept essentially consistent with each other. In addition, the cold-end temperature sensor 01 is usually bonded to the elastic plate 02. In order to prevent the adhesive from overflowing from the elastic plate 02 in the bonding process, guard plates are respectively provided at both sides of the elastic plate 02 at a position where it is bonded to the cold-end temperature sensor 01.

To further process and apply the temperature value measured by the cold-end temperature sensor 1, a lead-out wire of the cold-end temperature sensor 01 is led out via a lead-out wire terminal 06 which is plugged into the measurement board 42.

To encapsulate the thermocouple cold-end temperature compensation structure so that it can be used conveniently, the thermocouple cold-end temperature compensation structure in the present disclosure further comprises a cap 04 that is a square box. The cold-end temperature sensor 01, the elastic plates 02 and the second soaking blocks 03 are disposed in the cap 04, the second soaking blocks 03 are fixed to the cap 04 by screws 07, the lead-out wire of the cold-end temperature sensor 01 is led out from the tail part of the cap 04 and then connected into the lead-out wire terminal 06, the front end of the cap 04 is provided with two sockets 041 that respectively correspond to the positions between the elastic plates 02 and the second soaking blocks 03, the cold ends of the thermocouple 05 are respectively inserted into the position between the elastic plates 02 and the second soaking blocks 03 from the two sockets 041. Under the action of the elastic force of the elastic plates 02, both the elastic plates 02 and the second soaking blocks 03 are in close contact with the cold end of the thermocouple 05.

In order to ensure the performance of the thermocouple cold-end temperature compensation structure, it is required that the thermal capacity of the second soaking block 03 should be much larger than the thermal capacity of the elastic plate 02 and the thermal capacity of the cold-end temperature sensor 01. Besides, the cold end of the thermocouple 05, the second soaking block 03, the elastic plate 02 and the cold-end temperature sensor 01 should have high thermal conductivity; the cold-end temperature sensor 01 on the elastic plate 02 should be thermal insulated from the environment as far as possible. For example, a plastic sleeve or insulating glue should be applied to the portion of the cold-end temperature sensor 01 that is not in contact with the elastic plate 02.

In actual use, the cold end of the thermocouple 05 is connected between the elastic plate 02 and the second soaking block 03. When the temperature of the cold end of the thermocouple 05 is not consistent with the temperature of the second soaking block 03 and the elastic plate 02, heat will be transferred from the cold end of the thermocouple 05 to the second soaking block 03 and the elastic plate 02. As the thermal capacity of the second soaking block 03 is relatively large, the temperature of the cold end of the thermocouple 05 tends to the temperature of the soaking block 03. Besides, since the thermal capacity of the elastic plate 02 and the thermal capacity of the cold-end temperature sensor 01 on the elastic plate 02 are relatively small, the temperature of the cold-end temperature sensor 01 tends to the temperature of the cold end of the thermocouple 05 quickly, so that the temperature of the cold-end temperature sensor 01 quickly becomes essentially consistent with the temperature of the cold end of the thermocouple 05.

Figure 21:
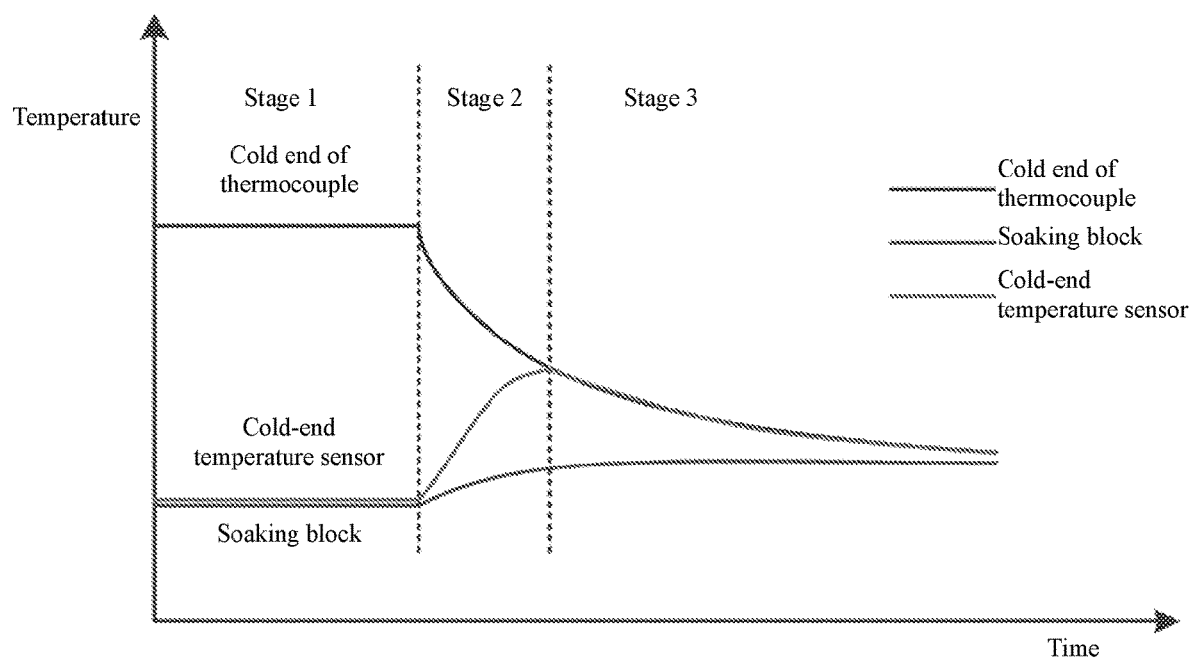
FIG. 21 is a working curve of the thermocouple cold-end temperature compensation structure.

FIG. 21 shows a working curve of the thermocouple cold-end temperature compensation structure in the present disclosure. The entire working process is divided into three stages:

Stage 1:

The cold-end temperature sensor 01 and the second soaking block 03 are located in the cap 04 (equivalent to a traditional cold-end heat-insulating compartment), and their temperatures are essentially the same; the temperature of the cold end of thermocouple 05 is inconsistent with the temperature of the cold-end temperature sensor 01 and the temperature of the second soaking block 03.

Stage 2:

The cold end of thermocouple 05 starts to transfer heat to the second soaking block 03, the elastic plate 02 and the cold-end temperature sensor 01 on the elastic plate 02 at the same time, and simultaneously the temperatures start to change, the temperature of the cold end of the thermocouple 05 tends to the temperature of the cold-end temperature sensor 01 (elastic plate 02) and the second soaking block 03;

Since the thermal capacity of the second soaking block 03 is relatively large, the temperature change of the second soaking block 03 is relatively slow. Besides, due to the large thermal capacity of the second soaking block 03, the temperature of the cold end of the thermocouple 05 may change quickly towards the temperature of the second soaking block 03;

Since the thermal capacity of the elastic plate 02 and the thermal capacity of the cold-end temperature sensor 01 on the elastic plate 02 are relatively small, the temperature change is quick. The temperature of the elastic plate 02 and the cold-end temperature sensor 01 on the elastic plate 02 may change quickly towards the temperature of the cold end of the thermocouple 05.

Under the combined effect of the second soaking block 03 and the elastic plate 02, the temperature of the cold-end temperature sensor 01 may tend to be consistent with the temperature of the cold end of the thermocouple 05 quickly. At the end of stage 2, the temperature of the cold-end temperature sensor 01 on the elastic plate 02 is essentially consistent with the temperature of the cold end of the thermocouple 05, but is still different from the temperature of the second soaking block 03.

Stage 3:

The temperature of the cold end of the thermocouple 05 and the temperature of the cold-end temperature sensor 01 on the elastic plate 02 change almost synchronously, and the temperature of the cold-end temperature sensor 01 can already accurately reflect the temperature of the cold end of the thermocouple 05.

The thermocouple cold-end temperature compensation structure can quickly measure the temperature of the cold end of the thermocouple and has high efficiency. In the measurement process of the thermocouple, in order to ensure that the temperature of the cold end of thermocouple 05 is consistent with the temperature of the cold-end temperature sensor 01, the thermocouple cold-end temperature compensation structure in the present disclosure can reduce the waiting time from the original a few minutes or even a dozen of minutes to a dozen of seconds or even a few seconds (depending on factors such as the temperature of the cold end of thermocouple 05 and the temperature of the cold-end temperature sensor 01 and the like). Especially, in the case of batch measurement of the temperature of the cold end of thermocouples, the measurement efficiency can be significantly improved, and the time can be saved.

Housing

Figure 22:
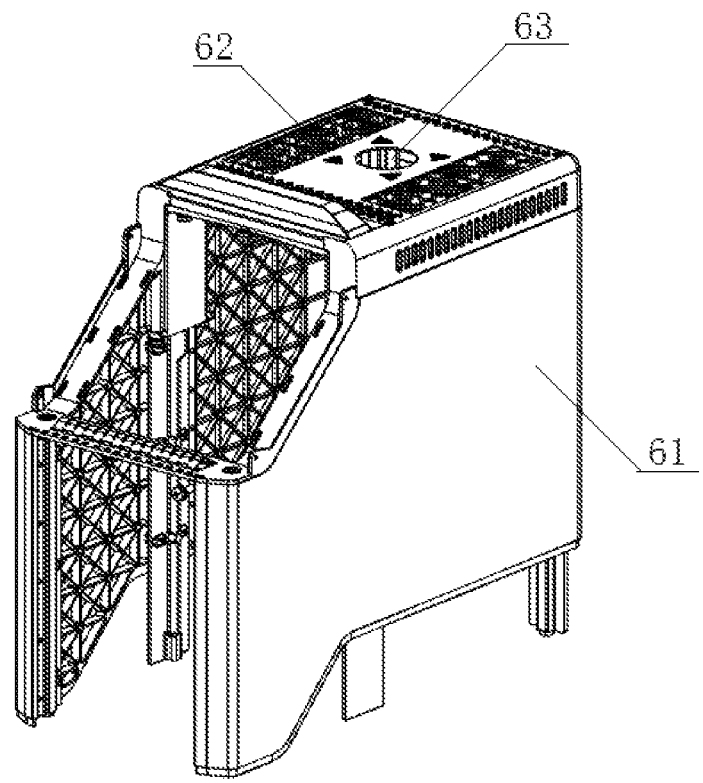
FIG. 22 is a schematic diagram of the structure of the upper housing assembly.

The housing of the low-temperature dry block temperature calibrator in the present disclosure comprises an upper housing 6 and a base 5. As shown in FIG. 22, the lower end of the upper housing 6 is open, and the upper housing 6 entirely cover the base 5 and engaged to the base 5 on the periphery, and the control board assembly 2 and the furnace body 1 are arranged in the housing formed by the upper housing 6 and the base 5; the lower part of the front side surface of the upper housing 6 has an assembling area that matches the measurement board assembly 4 in shape and size, the upper part of the front side surface has an assembling area that matches the system board assembly 3 in shape and size, and the top surface of the shell 61 of the upper housing 6 is provided with a through-hole 63 that corresponds to the furnace opening at the upper end of the furnace body 1 so that a temperature element under test is inserted therein; in order to facilitate heat dissipation, the top surface of the shell 61 of the upper housing 6 is also provided with heat dissipation holes 62, which are used for heat dissipation of the furnace body 1 on one hand and may be used as exhaust outlets of the flow guide fan 26 on the other hand.

Through further optimization, the top surface of the shell 61 of the upper housing 6 is spaced apart from the flow guide fan 26 at the top of the control board assembly 2. Thus, when the flow guide fan 26 operates, it not only drives the airflow in the control board assembly 2 to flow but also drives the airflow in the housing to flow, which is beneficial for overall heat dissipation of the instrument. A lifting handle is further provided at the top of the upper housing 6 to facilitate carrying.

Figure 23:
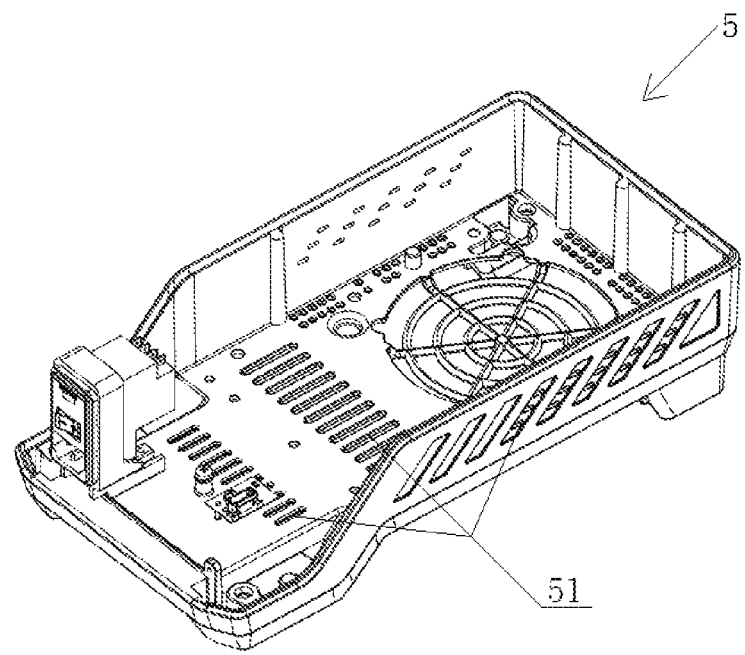
FIG. 23 is a schematic diagram of the structure of the lower housing assembly.

As shown in FIG. 23, the base 5 serves as a supporting component for the entire machine and is engaged to the upper housing 6 to form the instrument housing. A plurality of mounting holes are distributed on the base 5 for assembling the furnace body 1, the control board assembly 2, the measurement board assembly 4 and the upper housing 6; to supply external air into the instrument, the bottom surface and the side surfaces of the base 5 are provided with a plurality of ventilation slots 51 for introducing external air to facilitate heat dissipation. The form, quantity and positions of the ventilation slots and the like may be designed according to the actual requirement, and there is no particular restriction.

The upper housing 6 may be made of a plastic material, which is beneficial for reducing the weight of the entire low-temperature dry block temperature calibrator.

The above components are assembled in the above-mentioned connection relation into the low-temperature dry block temperature calibrator in the present disclosure. The low-temperature dry block temperature calibrator in the present disclosure may be assembled as follows: The furnace body 1 is mounted at a back position of the base 5, the control board assembly 2 is mounted on the base 5 at a position near the furnace body 1 and is connected to the furnace body 1, the upper housing 6 is placed on the base 5 and engaged to the base 5 on the periphery, the measurement board assembly 4 is mounted on the lower part of the front panel of the upper housing 6 of the instrument, and the system board assembly 3 is mounted on the upper part of the front panel of the upper housing 6. Thus, the assembling of the low-temperature dry block temperature calibrator is completed.

In the low-temperature dry block temperature calibrator in the present disclosure, the system board 31, the measurement board 41, the refrigerating plates 11-4, the sensor group 11-5, the cooling fan 13, and the flow guide fan 26, etc. are electrically connected with the control board 24, and all of the above-mentioned components are powered by the switching power supply 22. During operation, the control board 24 receives, analyzes and process the temperature data collected by the sensor group 11-5, the parameters set by the system board assembly 3, and the electrical signals measured by the measurement board assembly 4, generates control commands and sends the control commands to the actuator of the refrigerating fins 11-4 and the cooling fan 13 in the furnace body 1 and thereby the control board controls the temperature of the furnace core 11, and sends the processed data to the system board assembly 3 at the same time for display.

The low-temperature dry block temperature calibrator is in a modular design, and the furnace body 1 and each components are independent from each other, which is facilitate for disassembling and maintenance; Bluetooth and Wi-Fi assemblies are arranged in the control board assembly 2 to realize wireless communication with external terminals and facilitate field use; the calibrator utilizes a touch screen to set parameters, which has high operation efficiency and is convenient to use; the low-temperature dry block temperature calibrator is reasonable and compact in structural design, small in size, light in weight and portable.

Those skilled in the art should appreciate that the above examples or embodiments are only provided for the purpose of describing the present disclosure, without constituting any limitation to the present disclosure, and various equivalent variations and modifications to the present disclosure are within the scope of the present disclosure.

The invention claimed is:

1. A low-temperature dry block temperature calibrator, used for temperature calibration of a temperature element under test, comprising:
   a furnace body provided with a furnace opening into which a temperature element under test is inserted, and a bottom of the furnace body is fixed on a base; and
   a control board assembly whose bottom is fixed on the base;
   wherein the base and an upper housing enclose the furnace body and the control board assembly, a through-hole is formed on the upper housing at a position corresponding to the furnace opening of the furnace body, and a plurality of heat dissipation holes are formed on a top surface of the upper housing, and
   wherein there is a spacing between a top of the control board assembly and the upper housing, a flow guide fan is provided at the top of the control board assembly, and a flow guide plate configured to guide an air flow from the flow guide fan to the heat dissipation holes is provided above the flow guide fan.

2. The low-temperature dry block temperature calibrator according to claim 1, wherein the control board assembly comprises:
   a control board bracket having a structure of U-shaped slot;
   a switching power supply disposed and fixed in the U-shaped slot of the control board bracket;
   a control board fixed at an opening of the U-shaped slot of the control board bracket;
   wherein a heat dissipation block is mounted on one side of a lower part of the control board, and the side of the control board on which the heat dissipation block is mounted faces the switching power supply; and the flow guide fan is mounted at a top of the switching power supply.

3. The low-temperature dry block temperature calibrator according to claim 1, wherein the furnace body comprises:
   a furnace core comprising a foam thermal insulation body, a thermostatic block arranged inside the foam thermal insulation body, a first soaking block mounted in an open slot arranged on an upper part of the thermostatic block, and radiators mounted on two sides of the foam thermal insulation body; and
   a cooling fan disposed below the furnace core.

4. The low-temperature dry block temperature calibrator according to claim 3,
   wherein the furnace core further comprises a sensor group, which comprises a plurality of sensing elements including a pair of differential thermocouples, a thermal resistance temperature sensor and an over-temperature alarm sensor, and
   wherein the plurality of sensing elements are mounted in a plurality of mounting via-holes arranged in the foam thermal insulation body, and a probe portion of the sensing element is embedded in the thermostatic block.

5. The low-temperature dry block temperature calibrator according to claim 3, wherein the furnace core further comprises an air guide plate, a bottom of the foam thermal insulation body has a V-shaped structure, the cross section of the air guide plate has a V-shaped long plate structure, and the air guide plate is overlapped with the V-shaped bottom of the foam thermal insulation body, and two side edges of the air guide plate are respectively fixed to bottom edges of the radiators disposed on the two sides of the foam thermal insulation body at a position near the foam thermal insulation body.

6. The low-temperature dry block temperature calibrator according to claim 3, wherein the furnace body further comprises a furnace opening heat-insulating block made of polytetrachloroethylene material and a top decorative plate disposed at a top of the furnace opening heat-insulating block, the furnace opening heat-insulating block is mounted at the furnace opening at an upper end of the furnace core, and the top decorative plate is connected to the radiators by screws.

7. The low-temperature dry block temperature calibrator according to claim 3, wherein the furnace core further comprises a plurality of refrigerating plates mounted in through-slots respectively arranged on two side walls of the foam thermal insulation body, one side of the refrigerating plates is in contact with the thermostatic block arranged in the foam thermal insulation body, and the other side of the refrigerating plates is in contact with a hot end of the radiators.

8. The low-temperature dry block temperature calibrator according to claim 7, wherein the thermostatic block is a square body formed by two opposing recessed arc-shaped surfaces and two opposing horizontal side surfaces, the cross-sectional shape of the thermostatic block is an hourglass shape that is wider at the two ends and narrower in the middle, and the two horizontal side surfaces of the thermostatic block are respectively in contact with the refrigerating plates.

9. The low-temperature dry block temperature calibrator according to claim 3, wherein the radiator is a first radiator, the first radiator comprises a set of fins formed by a plurality of fins and a soaking plate vertically connected with the set of fins, the fins are sheet-shaped aluminum foils, the plurality of fins are arranged in parallel with each other and spaced apart from each other, and the set of fins are connected with the soaking plate into a whole by welding, crimping or bonding.

10. The low-temperature dry block temperature calibrator according to claim 9, wherein the first radiator further comprises a base plate fixedly connected to the soaking plate, the soaking plate comprises a flat plate portion, one side of the flat plate portion is tightly attached and fixed to the set of fins and the other side of the flat plate portion extends outwards and forms a boss portion, the boss portion is provided with a cavity therein, an inner surface of the cavity has a porous structure, and the cavity is filled with a cooling medium; the base plate is provided with one or more through-slots that match the boss portion of the soaking plate in shape and size, the boss portion of the soaking plate is embedded into the through-slot, and the base plate and the soaking plate are fixedly connected into a whole.

11. The low-temperature dry block temperature calibrator according to claim 3, wherein the radiator is a second radiator, which comprises a U-shaped thermo-tube, a heat conducting plate and a set of heat dissipation fins formed by a plurality of heat dissipation fins, wherein the heat dissipation fins are sheet-shaped aluminum foils, the plurality of heat dissipation fins are arranged in parallel and spaced apart from each other to form the set of heat dissipation fins, and the set of heat dissipation fins are connected with the heat conducting plate into a whole by welding, crimping or bonding; the U-shaped thermo-tube comprises first side arms disposed in parallel, second side arms disposed in parallel, and a connecting section connecting the first side arms and the second side arms, wherein the first side arms are inserted between the set of heat dissipation fins and the heat conducting plate, and the second side arms are inserted into the set of heat dissipation fins.

12. The low-temperature dry block temperature calibrator according to claim 11, wherein a cavity is provided in the U-shaped thermo-tube and filled with a cooling medium, and an inner surface of the cavity has a porous structure.

13. The low-temperature dry block temperature calibrator according to claim 12, wherein the second radiator further comprises a first side plate and a second side plate, which are arranged vertically on both sides of the heat conducting plate respectively to form into a rectangular slot structure, the heat conducting plate is positioned at a bottom of the rectangular slot structure, the set of heat dissipation fins are arranged inside the rectangular slot structure, and each heat dissipation fin is parallel to the first side plate and the second side plate located on the both sides.

14. The low-temperature dry block temperature calibrator according to claim 13, wherein the first side plate comprises a rectangular fixing plate tightly attached to the set of heat dissipation fins, and three sides of the fixing plate that are not adjacent to the heat conducting plate respectively extend outwards vertically to form a folded edge respectively; the second side plate and the first side plate are identical in structure and are arranged symmetrically on the both sides of the heat conducting plate; a plurality of second semi-circular concave strips arranged on a side of the heat conducting plate that is tightly attached to the set of heat dissipation fins are correspondingly combined with a plurality of first semi-circular concave strips arranged on the set of heat dissipation fins and a plurality of second semi-circular openings arranged on the fixing plates located on both sides so as to form a plurality of first circular holes, and the first side arms of a plurality of U-shaped thermo-tubes are inserted into the corresponding first circular holes; a plurality of circular through-holes are distributed with an equal interval on a side of the fixing plate that is away from the heat conducting plate; a plurality of second circular holes are distributed with an equal interval on one side of the set of heat dissipation fins which is away from the heat conducting plate, and the second side arms of the plurality of U-shaped thermo-tubes pass through the plurality of circular through-holes of the fixing plate and are inserted into the second circular holes of the set of heat dissipation fins.

15. The low-temperature dry block temperature calibrator according to claim 14, wherein the plurality of U-shaped thermo-tubes are grouped into two groups, the first side arms of each group of the plurality of U-shaped thermo-tubes are tightly attached together, while the second side arms are spaced apart at an equal interval; the corresponding first circular holes are also grouped into two groups and match the first side arms of the U-shaped thermo-tubes in shape; the second circular holes are spaced apart at an equal interval and match the second side arms of the U-shaped thermo-tubes in shape.

16. The low-temperature dry block temperature calibrator according claim 1, further comprising a measurement board assembly, which is assembled on a side surface of the upper housing and electrically connected with the control board assembly, wherein the measurement board assembly comprises a front panel and a measurement board, the measurement board is provided with a plurality of test connection terminals, jacks are respectively provided on the front panel at a position in correspondence with the test connection terminals of the measurement board, and the front panel and the measurement board are stacked and fixed in a circumferential direction in a way that the jacks are aligned to the test connection terminals, and wherein the measurement board is provided with a TC socket element, which has a thermocouple cold-end temperature compensation structure and is fixed on the measurement board, and two sockets provided at a front end of the TC socket element correspond to the jacks arranged on the front panel and are used for plugging a thermocouple.

17. The low-temperature dry block temperature calibrator according to claim 16, wherein the thermocouple cold-end temperature compensation structure comprises a cold-end temperature sensor, second soaking blocks and a cap, wherein two second soaking blocks are provided and spaced apart from each other, each second soaking block is connected with an elastic plate thereon, the cold-end temperature sensor is mounted on an upper side of either elastic plate, the cold end of the thermocouple is disposed between the elastic plate and the second soaking blocks and is tightly attached to the elastic plate and the second soaking block, and the thermal capacity of the second soaking blocks is much larger than the thermal capacity of the elastic plate and the thermal capacity of the cold-end temperature sensor.

18. The low-temperature dry block temperature calibrator according to claim 17, wherein the elastic plate is an elastomer with small thermal capacity and good heat conductivity and has an S-shaped structure, a tail end of the elastic plate is fixed to a tail end of the second soaking block, a head end of the elastic plate rises up, and a portion close to a head end is freely disposed on an upper surface of the second soaking block; and a heat-conducting adhesive is applied between the two second soaking blocks.

19. The low-temperature dry block temperature calibrator according to claim 18, wherein the thermocouple cold-end temperature compensation structure further comprises a lead-out wire terminal, a lead-out wire of the cold-end temperature sensor is led out from a tail of the cap to the lead-out wire terminal, and the lead-out wire terminal is plugged on the measurement board; and a front end of the cap is provided with two sockets, which correspond to the position between the elastic plate and the second soaking blocks, so that the cold end of the thermocouple is inserted therein.

20. The low-temperature dry block temperature calibrator according to claim 19, wherein a plastic sleeve or thermal insulation adhesive is provided at a portion of the cold-end temperature sensor mounted on the elastic plate that the cold-end temperature sensor is not in contact with the elastic plate; the cold-end temperature sensor is adhered to the elastic plate by an adhesive different from the thermal insulation adhesive, and a protective plate is respectively provided at the both sides of the elastic plate at a position where it is bonded to the cold-end temperature sensor.

* * * * *